(12) United States Patent
Albero et al.

(10) Patent No.: US 11,797,954 B1
(45) Date of Patent: Oct. 24, 2023

(54) DIGITAL CHECK DISBURSEMENT USING DIGITAL CHIP AND DISTRIBUTED LEDGER METHODS

(71) Applicant: Bank of America Corporation, Charlotte, NC (US)

(72) Inventors: George Albero, Charlotte, NC (US); Maharaj Mukherjee, Poughkeepsie, NY (US); Benjamin Moores, Ventura, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/717,561

(22) Filed: Apr. 11, 2022

(51) Int. Cl.
*G06Q 40/00* (2023.01)
*G06Q 20/04* (2012.01)
(52) U.S. Cl.
CPC ................ *G06Q 20/0425* (2013.01)
(58) Field of Classification Search
CPC ......... G06Q 20/38215; G06Q 20/3821; G06Q 20/0425
See application file for complete search history.

(56) References Cited

U.S. PATENT DOCUMENTS

| | | | |
|---|---|---|---|
| 8,059,881 B1 | 11/2011 | Thomas et al. | |
| 9,430,852 B2 | 8/2016 | Tatham et al. | |
| 10,621,660 B1 | 4/2020 | Medina et al. | |
| 10,706,466 B1 | 7/2020 | Ethington et al. | |
| 10,748,122 B1 | 8/2020 | Yaqub et al. | |
| 10,853,800 B1 * | 12/2020 | Meyer | G06Q 20/38215 |
| 10,896,408 B1 | 1/2021 | Prasad et al. | |
| 10,896,409 B2 | 1/2021 | Kang | |
| 10,977,624 B2 | 4/2021 | Kurian et al. | |
| 10,990,912 B2 | 4/2021 | Dravneek et al. | |
| 11,030,682 B1 | 6/2021 | Hockey et al. | |
| 11,068,976 B1 | 7/2021 | Voutour et al. | |
| 11,120,158 B2 | 9/2021 | Hockey et al. | |
| 11,222,315 B1 | 1/2022 | Prasad et al. | |

(Continued)

OTHER PUBLICATIONS

Jacob, Katy (Digital Checks as Electronic Payment Orders, https://www.chicagofed.org/-/media/publications/policy-discussion-papers/2009/pdp2009-5-pdf.pdf, Nov. 17, 2009) (Year: 2009).*

(Continued)

*Primary Examiner* — Elizabeth H Rosen
*Assistant Examiner* — Mark H Gaw
(74) *Attorney, Agent, or Firm* — Banner & Witcoff, Ltd.

(57) ABSTRACT

Aspects of the disclosure relate to digital check processing. A computing platform may receive, from a first recipient, a request to transfer a first portion of funds, corresponding to the first digital check image, to a second recipient account and a second portion of the funds, corresponding to the first digital check image, to a third recipient account. The computing platform may generate second and third digital check images representative of the first and second portions of the funds respectively. Based on successful validation of the second digital check image and the third digital check image, the computing platform may embed, into the second and third digital check images, a digital chip that indicates the successful validation. The computing platform may send, to the second recipient account and the third recipient account, the second and third digital check images respectively.

20 Claims, 15 Drawing Sheets

(56) References Cited

U.S. PATENT DOCUMENTS

| | | |
|---|---|---|
| 11,232,517 B1 | 1/2022 | Medina et al. |
| 11,250,397 B2 | 2/2022 | Hunter et al. |
| 2003/0056104 A1* | 3/2003 | Carr ................... H04N 1/32203 |
| | | 713/176 |
| 2010/0280859 A1 | 11/2010 | Frederick, II |
| 2010/0287097 A1 | 11/2010 | Treadwell |
| 2014/0372295 A1 | 12/2014 | Tatham et al. |
| 2018/0285836 A1 | 10/2018 | Enobakhare |
| 2019/0354941 A1 | 11/2019 | Welch |
| 2020/0126047 A1 | 4/2020 | Megerdichian et al. |
| 2020/0160286 A1 | 5/2020 | Vukich et al. |
| 2020/0334671 A1 | 10/2020 | Davies et al. |
| 2020/0364703 A1 | 11/2020 | Joveski et al. |
| 2021/0158309 A1* | 5/2021 | McGinlay ................ G06N 3/02 |
| 2021/0272123 A1 | 9/2021 | Burke |
| 2022/0058637 A1* | 2/2022 | Yan ........................ G06Q 40/02 |

OTHER PUBLICATIONS

Nikita Singh et al. "Blockchain based e-cheque clearing framework" Scalable Computing: Practice and Experience 20.3 (2019) pp. 511-526 (Year: 2019).*

Nikita Singh et al. "Blockchain based e-cheque clearing framework" Scalable Computing: Practice and Experience 20.3 (2019) pp. 511-526.

May 5, 2023—U.S. Office Action—U.S. Appl. No. 17/717,656.

* cited by examiner

305

Check Processing Application

Date: March 23, 2022

Pay to The Order of: Person #1    $150.00

One Hundred Fifty    Dollars

One Hundred Fifty Dollars Zero Cents

Check Processing Application

𝒫erson #1
Person #2    Date: March 25, 2022

Pay to The Order of: ▮▮▮▮    ▮▮▮

Dollars

One Hundred Dollars Zero Cents

FIG. 4

Check Processing Application

505

*Person #1*
Person #3  Date: March 25, 2022

Pay to The Order of: ▉▉▉  ▉▉
       ▉▉▉▉▉          Dollars

Fifty Dollars Zero Cents

FIG. 5

Check Processing Application

605

*Person #3*
Person #4  Date: March 26, 2022

Pay to The Order of: ▉▉▉  ▉▉
       ▉▉▉▉▉          Dollars

Fifty Dollars Zero Cents

FIG. 6

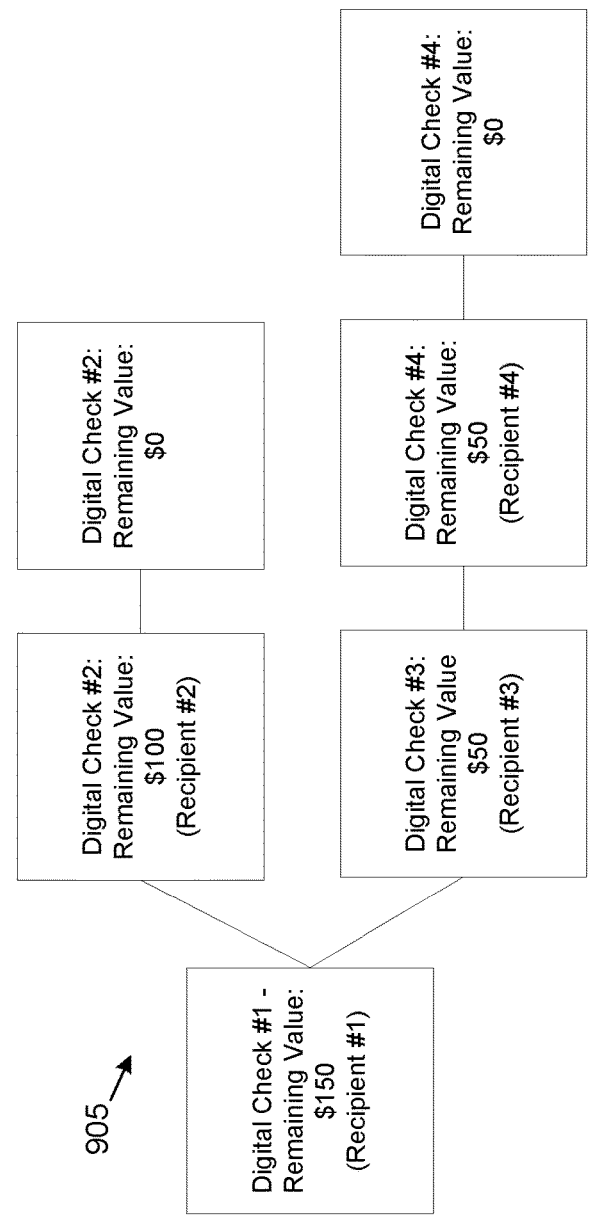
FIG. 8
FIG. 9

US 11,797,954 B1

DIGITAL CHECK DISBURSEMENT USING DIGITAL CHIP AND DISTRIBUTED LEDGER METHODS

BACKGROUND

Aspects of the disclosure relate to computer hardware and software for event processing. In some instances, individuals may use enterprise applications (such as mobile banking applications) to perform events such as depositing checks. For example, the application may be used to capture an image of the check, and may process the check for deposit into the individual's account accordingly. In some instances, however, an individual may want to perform other functions beyond a simple deposit into a personal account. Such instances may require the individual to physically enter a branch location and/or perform other cumbersome steps to perform the desired function. As mobile applications are increasingly used for check processing, it may be important to expand the functionality of such applications to increase client convenience, while maintaining the security parameters offered by traditional methods of providing such functions.

SUMMARY

Aspects of the disclosure provide effective, efficient, scalable, and convenient technical solutions that address and overcome the technical problems associated with digital event processing. In accordance with one or more embodiments of the disclosure, a computing platform comprising at least one processor, a communication interface, and memory storing computer-readable instructions may receive a first digital check, which may include an initial payor, a first recipient, and an amount of funds. The computing platform may receive, from a first user device associated with the first recipient account, a request to transfer a first portion of the funds, which may be a portion of the amount of the funds of the first digital check image, to an account of a second recipient and a second portion of the funds, which may be a portion of the amount of funds of the first digital check image, to an account of a third recipient, where the first recipient, the second recipient, and the third recipient each may be unique individuals. The computing platform may generate a second digital check image representative of the first portion of the funds, where the second digital check image may include a watermark indicating a value of the first portion of the funds. The computing platform may generate a third digital check image representative of the second portion of the funds, where the third digital check image may include a watermark indicating a value of the second portion of the funds. The computing platform may validate the second digital check image and the third digital check image. Based on successful validation of the second digital check image and the third digital check image, the computing platform may embed, into the second digital check image and the third digital check image, a digital chip that indicates the successful validation. The computing platform may send, to the account of the second recipient and the account of the third recipient, the second digital check image and the third digital check image respectively. The computing platform may send one or more commands to an event processing server directing the event processing server to execute a transfer of the first portion of the funds from an account of the initial payor of the first digital check image to the account of the second recipient, which may cause the event processing server to execute the transfer of the first portion of the funds from the account of the initial payor of the first digital check image to the account of the second recipient.

In one or more instances, the computing platform may receive a request to deposit the second digital check image, and sending the one or more commands to the event processing server directing the event processing server to execute the transfer of the first portion of the funds from the account of the initial payor of the first digital check image to the account of the second recipient may be in response to receiving the request to deposit the second digital check image. In one or more instances, receiving the request to deposit the second digital check image may include receiving an endorsement of the second digital check image by the second recipient.

In one or more examples, the computing platform may compare a value of the first portion of the funds to an endorsement threshold. Based on identifying that the first portion of the funds exceeds the endorsement threshold, the computing platform may prompt the second recipient for the endorsement.

In one or more instances, the computing platform may automatically send the one or more commands to the event processing server directing the event processing server to execute the transfer of the first portion of the funds from the account of the initial payor of the first digital check image to the account of the second recipient. In one or more instances, automatically sending the one or more commands to the event processing server directing the event processing server to execute the transfer of the first portion of the funds from the account of the initial payor of the first digital check image to the account of the second recipient may automatically cause a deposit of the first portion of the funds from the account of the initial payor of the first digital check image to the account of the second recipient without receiving an endorsement from the second recipient.

In one or more examples, sending the one or more commands to the event processing server directing the event processing server to execute the transfer of the first portion of the funds from the account of the initial payor of the first digital check image to the account of the second recipient may be based on verification of the embedded digital chip. In one or more examples, receiving the request to transfer the first portion of funds to the account of the second recipient may include receiving a user input, within the account of the first recipient, selecting the second recipient, where the second recipient may be selected from a friends list within a mobile banking application.

In one or more instances, the funds might not be distributed to the first recipient account. In one or more instances, the computing platform may receive, from the account of the third recipient, a request to transfer the second portion of the funds to an account of a fourth recipient. The computing platform may generate a fourth digital check image representative of the second portion of the funds. The computing platform may send, to the fourth recipient account and without disbursing the second portion of the funds to the account of the third recipient, the fourth digital check image.

In one or more examples, the fourth digital check image might not include personal identifiable information of the initial payor of the first digital check image. In one or more examples, the computing platform may receive user input from the account of the fourth recipient indicating that the second portion of the funds should be split between multiple accounts corresponding to the account of the fourth recipient. The computing platform may send one or more commands to the event processing server directing the event processing server to execute a transfer of the second portion of the funds from the account of the initial payor of the first digital check image to the multiple accounts of the fourth recipient, where the multiple accounts include a checking account and a savings account.

In one or more instances, validating the second digital check image and the third digital check image may include validating, using a distributed ledger, the second digital check image and the third digital check image. In one or more instances, the first digital check image and the second digital check image might not indicate an initial value of the first digital check image.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3-6 depict illustrative graphical user interfaces depicting digital checks in accordance with one or more example embodiments;

FIGS. 8 and 9 depict illustrative distributed ledgers for performing enhanced digital check transfers in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, there is not currently a method for uploading a digital image of a check and disbursing portions of the check to multiple parties. For example, an individual may receive a check for $10,000, and may want to deposit $2,000 in their account, and forward the remaining $8,000 (either equally or not equally) any number of additional recipients. Each recipient may create a digital signature embedded in the image or a watermark detailing the previous transactions and remaining value on the check. The recipient may use biometric validation, and a digital mark, chip, and/or signature may be embedded onto the check. Additionally or alternatively, each recipient action may create a blockchain record of the event and indicating how much money is still available in the check. The check may be forwarded by the latest recipient, if authorized, or auto forwarded from an original owner. In doing so, payments may be disbursed from a digital check image and each transaction may be recorded on the image, which may allow for multiple parties to be paid by one check.

Figure 1A:
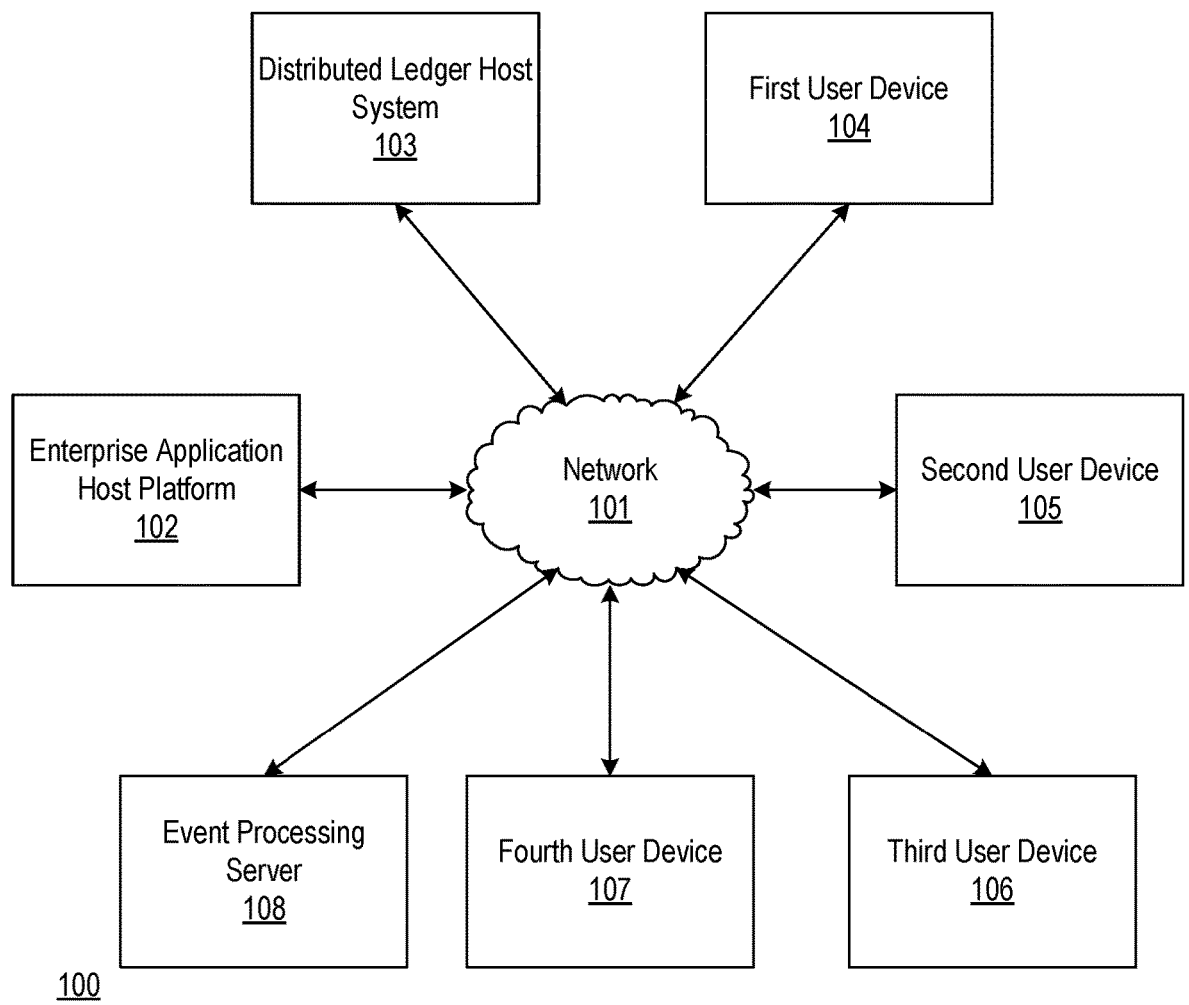
FIGS. 1A and 1B depict an illustrative computing architecture for performing enhanced digital check transfers in accordance with one or more example embodiments.
Figure 1B:
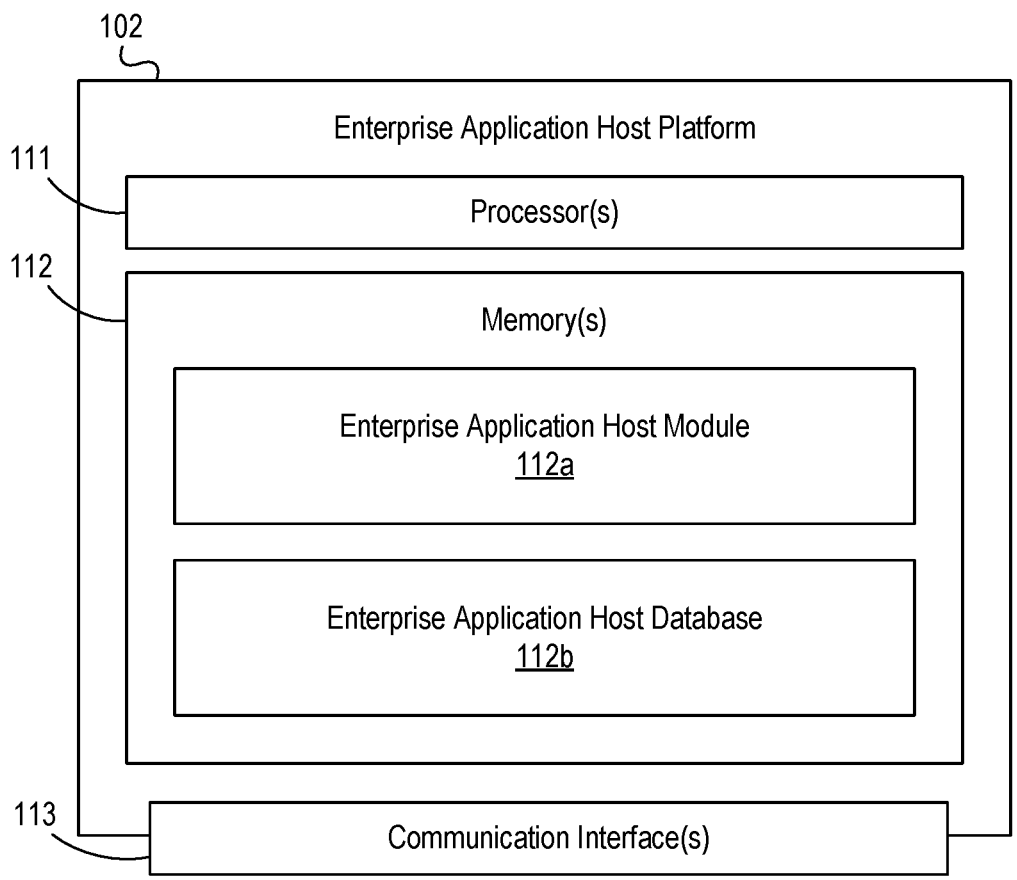

FIGS. 1A-1B depict an illustrative computing environment for performing enhanced digital check transfers in accordance with one or more example embodiments. Referring to FIG. 1A, computing environment 100 may include one or more computer systems. For example, computing environment 100 may include enterprise application host platform 102, distributed ledger host system 103, first user device 104, second user device 105, third user device 106, fourth user device 107, and/or event processing server 108.

As described further below, enterprise application host platform 102 may be a computer system that includes one or more computing devices (e.g., servers, server blades, or the like) and/or other computer components (e.g., processors, memories, communication interfaces) that may be used to host an enterprise application (e.g., a mobile banking application) as described further below. In these instances, the enterprise application host platform 102 may be configured to provide or otherwise support one or more application services (e.g., check processing, and/or other services). In some instances, the enterprise application host platform 102 may comprise an independent computing platform. In other instances, the enterprise application host platform 102 may be represented by one or more client device modules integrated into or otherwise stored at various client devices (e.g., first user device 104, second user device 105, third user device 106, fourth user device 107, and/or other user devices).

Distributed ledger host system 103 may be a computer system that includes one or more computing devices (e.g., servers, server blades, or the like) and/or other computer components (e.g., processors, memories, communication interfaces) that may be used to support a distributed ledger (e.g., blockchain, holochain, and/or other distributed ledger). In some instances, the distributed ledger host system 103 may be configured to communicate with the enterprise application host platform 102 to provide check validation and/or otherwise record transactions/events. In some instances, the distributed ledger host system 103 may be an optional system in the network 101.

First user device 104 may be and/or otherwise include a laptop computer, desktop computer, mobile device, tablet, smartphone, and/or other device that may be used by an individual to access a client application (e.g., a mobile banking application, or the like). In these instances, the first user device 104 may be configured with a camera, which may be used, e.g., to capture check images. In some instances, first user device 104 may be configured to display one or more user interfaces (e.g., digital check interfaces, or the like). In some instances, the first user device 104 may correspond to a first user.

Second user device 105 may be and/or otherwise include a laptop computer, desktop computer, mobile device, tablet, smartphone, and/or other device that may be used by an individual to access a client application (e.g., a mobile banking application, or the like). In these instances, the second user device 105 may be configured with a camera, which may be used, e.g., to capture check images. In some instances, second user device 105 may be configured to display one or more user interfaces (e.g., digital check interfaces, or the like). In some instances, the second user device 105 may correspond to a second user, different than the first user.

Third user device 106 may be and/or otherwise include a laptop computer, desktop computer, mobile device, tablet, smartphone, and/or other device that may be used by an individual to access a client application (e.g., a mobile banking application, or the like). In these instances, the third user device 106 may be configured with a camera, which may be used, e.g., to capture check images. In some instances, third user device 106 may be configured to display one or more user interfaces (e.g., digital check interfaces, or the like). In some instances, the third user device 106 may correspond to a third user, different than the first and second users.

Fourth user device 107 may be and/or otherwise include a laptop computer, desktop computer, mobile device, tablet, smartphone, and/or other device that may be used by an individual to access a client application (e.g., a mobile banking application, or the like). In these instances, the fourth user device 107 may be configured with a camera, which may be used, e.g., to capture check images. In some instances, fourth user device 107 may be configured to display one or more user interfaces (e.g., digital check interfaces, or the like). Although four user devices are shown, any number of user devices may be deployed in the systems/methods described below without departing from the scope of the disclosure. In some instances, the fourth user device 107 may correspond to a fourth user, different than the first, second, or third users.

Event processing server 108 may be a computer system that includes one or more computing devices (e.g., servers, server blades, or the like) and/or other computer components (e.g., processors, memories, communication interfaces) that may be used to process events (e.g., route funds between accounts, execute transactions, and/or otherwise perform enterprise functions). In some instances, the event processing server 108 may be independent from the enterprise application host platform 102, and in other instances, the event processing server 108 may be part of or otherwise integrated into the enterprise application host platform 102.

Computing environment 100 also may include one or more networks, which may interconnect enterprise application host platform 102, distributed ledger host system 103, first user device 104, second user device 105, third user device 106, fourth user device 107, and/or event processing server 108. For example, computing environment 100 may include a network 101 (which may interconnect, e.g., enterprise application host platform 102, distributed ledger host system 103, first user device 104, second user device 105, third user device 106, fourth user device 107, and/or event processing server 108).

In one or more arrangements, enterprise application host platform 102, distributed ledger host system 103, first user device 104, second user device 105, third user device 106, fourth user device 107, and/or event processing server 108 may be any type of computing device capable of sending and/or receiving requests and processing the requests accordingly. For example, enterprise application host platform 102, distributed ledger host system 103, first user device 104, second user device 105, third user device 106, fourth user device 107, event processing server 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise application host platform 102, distributed ledger host system 103, first user device 104, second user device 105, third user device 106, fourth user device 107, and/or event processing server 108 may, in some instances, be special-purpose computing devices configured to perform specific functions.

Referring to FIG. 1B, enterprise application host platform 102 may include one or more processors 111, memory 112, and communication interface 113. A data bus may interconnect processor 111, memory 112, and communication interface 113. Communication interface 113 may be a network interface configured to support communication between enterprise application host platform 102 and one or more networks (e.g., network 101, or the like). Memory 112 may include one or more program modules having instructions that when executed by processor 111 cause enterprise application host platform 102 to perform one or more functions described herein and/or one or more databases that may store and/or otherwise maintain information which may be used by such program modules and/or processor 111. In some instances, the one or more program modules and/or databases may be stored by and/or maintained in different memory units of enterprise application host platform 102 and/or by different computing devices that may form and/or otherwise make up enterprise application host platform 102. For example, memory 112 may have, host, store, and/or include enterprise application host module 112a and/or enterprise application host database 112b.

Enterprise application host module 112a may have instructions that direct and/or cause enterprise application host module 112a to provide enhanced digital check transfers, as discussed in greater detail below. Enterprise application host database 112b may store information used by enterprise application host module 112a and/or enterprise application host platform 102 in application of advanced techniques to provide enhanced digital check transfers and/or in performing other functions.

Figure 2A:
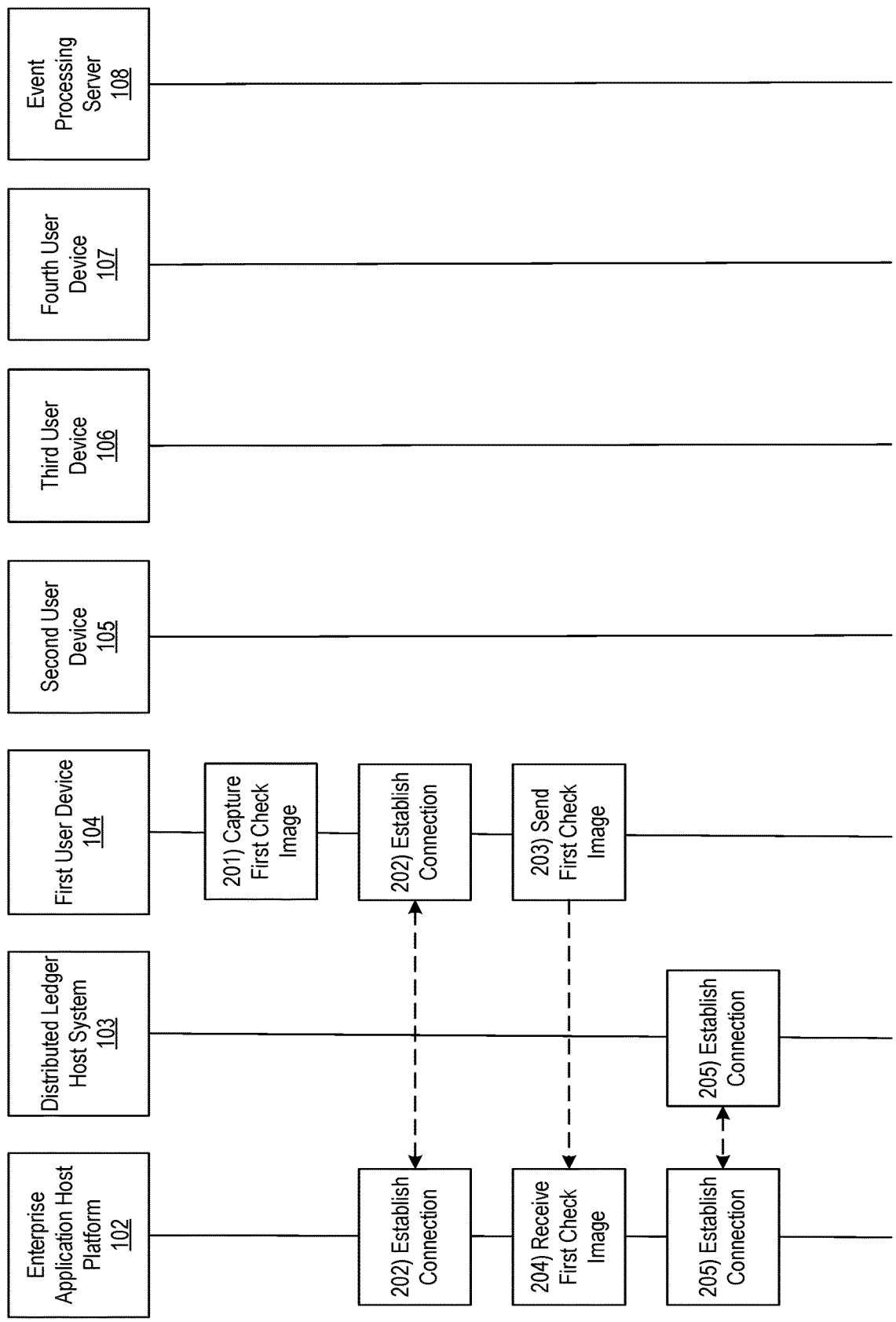
FIGS. 2A-2G depict an illustrative event sequence for performing enhanced digital check transfers in accordance with one or more example embodiments.

FIGS. 2A-2G depict an illustrative event sequence for performing enhanced digital check transfers in accordance with one or more example embodiments. Referring to FIG. 2A, at step 201, the first user device 104 may capture a first check image (e.g., similar to digital check 305, which is shown in FIG. 3). For example, the first user device 104 may capture an image of a check, directed from an initial payor to a first recipient (e.g., "Person #1" in FIG. 3). For example, the check may include an initial value of funds to be transferred from the initial payor to the first recipient. In some instances, the first user device 104 may capture the check image using an enterprise application (e.g., a mobile banking application) installed at the first user device 104 and/or supported by the enterprise application host platform 102.

At step 202, the first user device 104 may establish a connection with the enterprise application host platform 102. For example, the first user device 104 may establish a first connection with the enterprise application host platform 102 to link the first user device to the enterprise application host platform 102 (e.g., in preparation for sending the first check image). In some instances, the first user device 104 may identify whether a connection is already established with the enterprise application host platform 102. If a connection is already established with the enterprise application host platform 102, the first user device 104 might not re-establish the connection. If a connection is not yet established with the enterprise application host platform 102, the first user device 104 may establish the first connection as described herein.

At step 203, the first user device 104 may send the first check image, captured at step 201, to the enterprise application host platform 102. For example, the first user device 104 may send the first check image to the enterprise application host platform 102 while the first connection is established.

At step 204, the enterprise application host platform 102 may receive the first check image sent at step 203. For example, the enterprise application host platform 102 may receive the first check image via the communication interface 113 and while the first connection is established.

At step 205, the enterprise application host platform 102 may establish a connection with the distributed ledger host system 103. For example, the enterprise application host platform 102 may establish a second connection with the distributed ledger host system 103 to link the enterprise application host platform 102 with the distributed ledger host system 103 (e.g., in preparation for storing the first check image). In some instances, the enterprise application host platform 102 may identify whether a connection is already established with the distributed ledger host system 103. If a connection is already established with the distributed ledger host system 103, the enterprise application host platform 102 might not re-establish the connection. If a connection is not yet established with the distributed ledger host system 103, the enterprise application host platform 102 may establish the second connection as described herein.

Figure 2B:
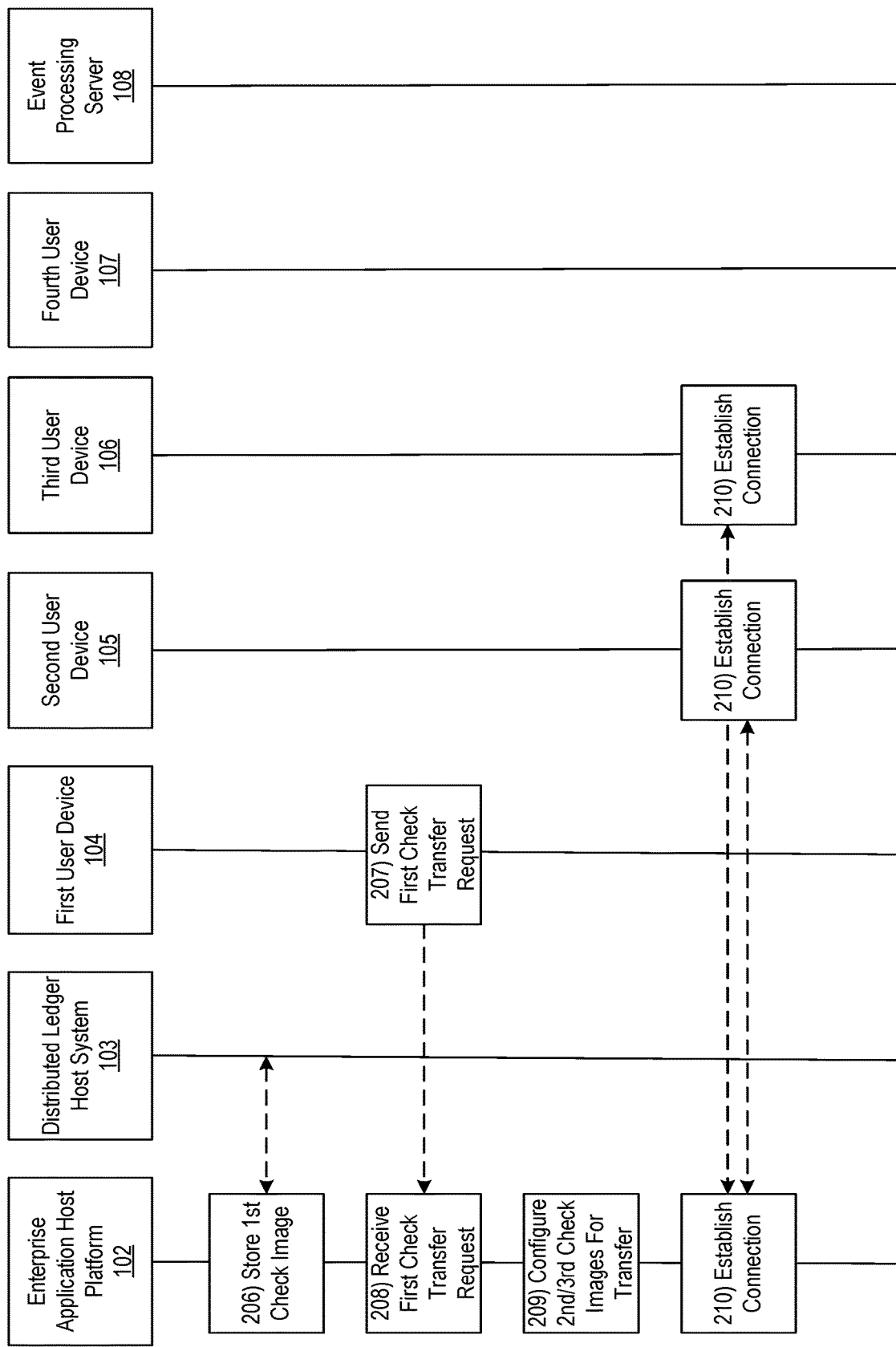

Referring to FIG. 2B, at step 206, the enterprise application host platform 102 may store information of the first check image/digital check in a distributed ledger. For example, for a new check/check image, the enterprise application host platform 102 may create a new chain for a distributed ledger, and may create an initial block in the chain that includes an identity of the initial payor, the first recipient, an amount of funds to be transferred, and/or other information (e.g., similar to distributed ledgers 805 and 905, as shown in FIGS. 8 and 9). In some instances, in creating the initial block, the enterprise application host platform 102 may communicate with the distributed ledger host system 103 to validate the check (e.g., to verify that the initial payor has sufficient funds to support a transfer of the indicated value of the check from their account to another account). In these instances, the enterprise application host platform 102 and/or distributed ledger host system 103 may add the initial block to the distributed ledger once the check is validated, and may (in some instances) include an indication within the block that the first digital check is validated. In some instances, in storing the first digital check to the distributed ledger, the enterprise application host platform 102 and/or the distributed ledger host system 103 may convert the first digital check to a quick response (QR) code, and may store the QR code to the distributed ledger. In some instances, the distributed ledger may be a blockchain, holochain, and/or other distributed ledger. In some instances, the enterprise application host platform 102 may communicate with the distributed ledger host system 103 via the communication interface 113 and while the second connection is established.

In some instances, the enterprise application host platform 102 may validate the first digital check with or without use of the distributed ledger. In some instances, after validating the first digital check, the enterprise application host platform 102 may embed a digital chip, watermark, and/or other feature into the first digital check, which may indicate that the first digital check is validated.

At step 207, the first user device 104 may send a first check transfer request to the enterprise application host platform 102. For example, the first user device 104 may receive user input indicating the first check transfer request through the enterprise application. In these instances, the first user device 104 may receive a request to transfer the check to one or more other recipients (e.g., a second recipient and a third recipient), without depositing funds corresponding to the check into an account of the first recipient. For example, rather than depositing the funds into the first recipient account and generating subsequent checks to transfer the funds, the first user device 104 may effectively reassign the value of the first digital check to one or more other recipient accounts. In some instances, the first user device 104 may send a first check transfer request requesting that portions of the funds corresponding to the check be transferred to different recipients and/or deposited into one or more accounts of the first recipient. For example, the first check transfer request may request a transfer of ⅔ of the funds to the second recipient and ⅓ of the funds to the third recipient. In some instances, the first user device 104 may send the first check transfer request to the enterprise application host platform 102 while the first connection is established.

In some instances, in the first user device 104 may receive (e.g., via user input) the first check transfer request, which may include a selection of the second and/or third recipients from a friends list (or other list of individuals) within the enterprise application, which may, e.g., avoid the need for the first recipient to have knowledge of account information for the second and/or third recipients.

At step 208, the enterprise application host platform 102 may receive the first check transfer request sent at step 207. For example, the enterprise application host platform 102 may receive the first check transfer request via the communication interface 113 and while the first connection is established.

At step 209, the enterprise application host platform 102 may configure second and/or third digital checks for transfer (e.g., to the second recipient account and/or third recipient account). For example, the enterprise application host platform 102 may generate new check images that include an updated value corresponding to each check (e.g., a first portion of the funds to be transferred to the second user account and a second portion of the funds to be transferred to the third user account). In these instances, the value, sender, and/or recipient for each check may be included as a watermark on the various check images. For example, the enterprise application host platform 102 may generate a second digital check similar to check image 405, which is shown in FIG. 4, which may indicate (e.g., using a watermark, or otherwise) that the value of the second digital check is one hundred dollars (rather than one hundred and fifty dollars as in the first digital check). In some instances, the enterprise application host platform 102 may also redact any personal identifiable information from the first digital check so as to conceal an initial sender and/or any previous recipients of the first digital check, and may instead display only the current sender/recipient of the second digital check. Similarly, the enterprise application host platform 102 may generate a third digital check similar to check image 505, which is shown in FIG. 5, and which may indicate (e.g., using a watermark, or otherwise) that the value of the third digital check is fifty dollars. In some instances, the enterprise application host platform 102 may validate that the sum of the values of the second digital check and the third digital check are equivalent to the value of the first digital check. In some instances, the enterprise application host platform 102 may modify any personal identifiable information and/or sender/recipient information as described above with regard to the second digital check. In both instances, these second and/or third digital checks may include the digital chip embedded in the first digital check, indicating that the checks are validated (e.g., that the initial payor has sufficient funds to allow processing of the checks). In these instances, the enterprise application host platform 102 may embed the digital chip in the second and/or third digital checks after validating that the first digital check includes the digital chip. In some instances, the second digital check and/or third digital checks may be modified versions of the first digital check.

At step 210, the enterprise application host platform 102 may establish connections with the second user device 105 and/or third user device 106. For example, the enterprise application host platform 102 may establish third and/or fourth connections with the second user device 105 and/or third user device 106 to link the enterprise application host platform 102 to the second user device 105 and/or third user device 106 (e.g., in preparation for sharing the second and/or third digital checks). In some instances, the enterprise application host platform 102 may identify whether or not connections are already established with the second user device 105 and/or third user device 106. If the connections are already established, the enterprise application host platform 102 might not re-establish the connections. If the connections are not yet established, the enterprise application host platform 102 may establish the third and/or fourth connections as described herein.

Figure 2C:
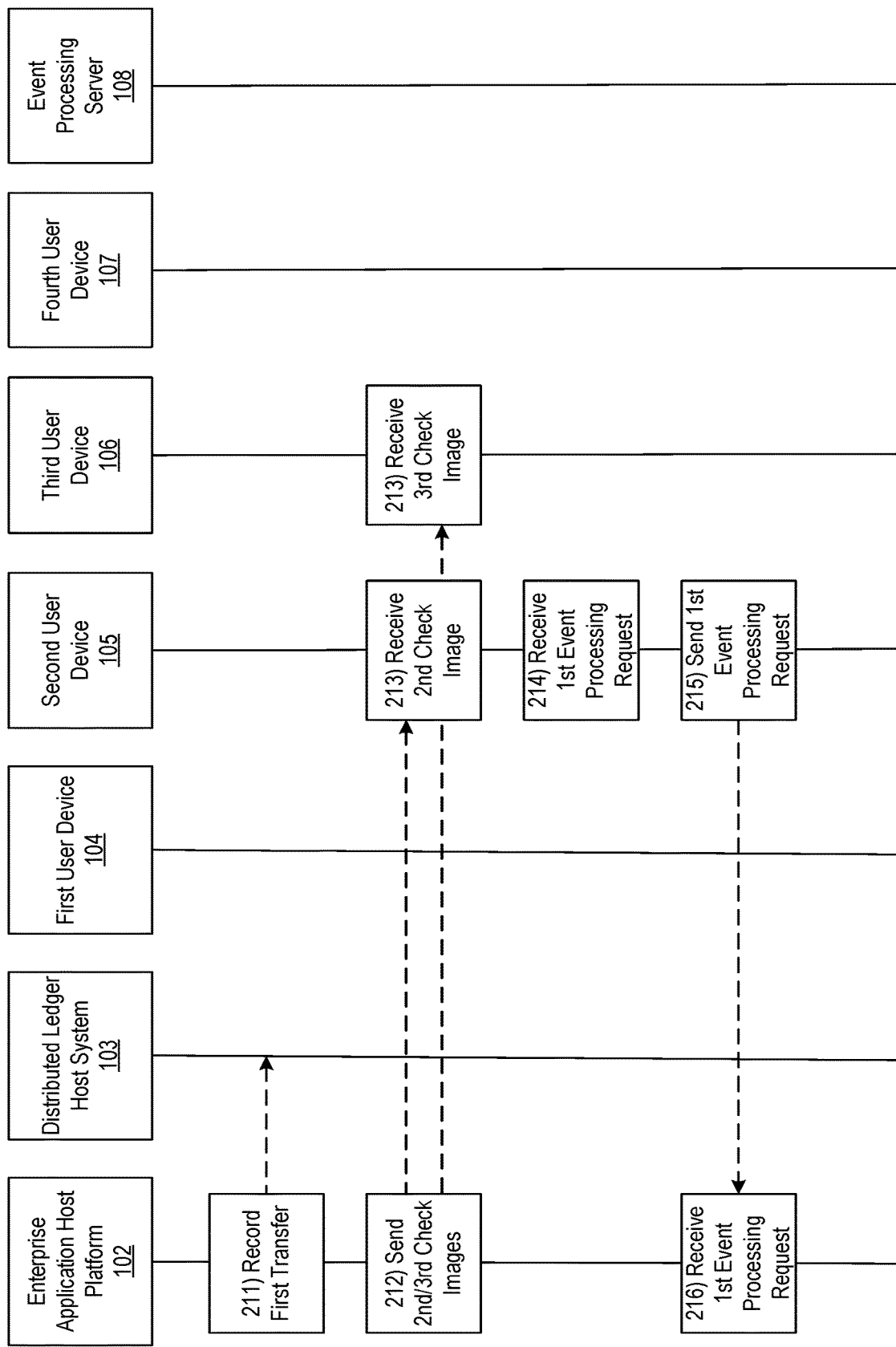

Referring to FIG. 2C, at step 211, in addition or as an alternative to configuring the second and/or third digital checks for transfer (as described above at step 209), the enterprise application host platform 102 may communicate with the distributed ledger host system 103 to record these transfers. For example, the enterprise application host platform 102 and/or distributed ledger host system 103 may modify the distributed ledger to include a second block that includes a value of each digital check and the corresponding recipient (e.g., $100, second recipient account; $50, first recipient account, or the like). In some instances, the enterprise application host platform 102 and/or distributed ledger host system 103 may add the initial block to the distributed ledger once the second and/or third digital checks are validated, and may (in some instances) include an indication within the block that the second and/or third digital checks are validated. In some instances, the enterprise application host platform 102 and/or distributed ledger host system 103 may modify the distributed ledger to include a different block for each digital check (e.g., a second block for the second digital check and a third block for the third digital check). In some instances, the enterprise application host platform 102 and/or distributed ledger host system 103 may record the second and third blocks on a single branch of the distributed ledger (e.g., as shown on distributed ledger 805). In other instances, the enterprise application host platform 102 and/or distributed ledger host system 103 may generate separate branches of the distributed ledger, each stemming back to the first block, for each of the second and third blocks (e.g., a different branch corresponding to each digital check, as shown on distributed ledger 905). In some instances, the enterprise application host platform 102 and/or distributed ledger host system 103 may convert the second and/or third digital check to QR codes, and may store the QR codes to the distributed ledger. In some instances, in modifying the distributed ledger, the enterprise application host platform 102 and/or distributed ledger host system 103 may modify a blockchain, holochain, and/or other distributed ledger.

At step 212, the enterprise application host platform 102 may send the second and/or third digital checks to the second user device 105 and/or third user device 106 respectively. For example, the enterprise application host platform 102 may send the second and/or third digital checks to the second user device 105 and/or third user device 106 via communication interface 113 and while the third and/or fourth connections are established. In some instances, in addition or as an alternative to sending the second and/or third digital checks, the enterprise application host platform 102 and/or the distributed ledger host system 103 may grant the second recipient and/or the third recipient access to the distributed ledger, so as to access the information of the second and/or third digital checks. In some instances, in granting the access to the distributed ledger, the enterprise application host platform 102 and/or the distributed ledger host system 103 may grant full ledger access to each recipient. In other instances, the enterprise application host platform 102 and/or the distributed ledger host system 103 may grant partial access to each recipient, so as to permit each recipient to view only a portion of the ledger that includes information specific to that recipient (e.g., the second and/or third users might not be able to view information about each other's checks or the information of the transfer from the initial payor to the first recipient).

At step 213, the second user device 105 and/or third user device 106 may receive the second digital check and/or third digital check, sent at step 212, respectively. For example, the second user device 105 and/or third user device 106 may receive the second digital check and/or third digital check while the third and/or fourth connections are established.

At step 214, the second user device 105 may receive a first event processing request. For example, the second user device 105 may receive a request to deposit the first portion of the funds, corresponding to the second digital check, into one or more accounts of the second recipient (e.g., a savings account, checking account, investment account, and/or other account). For example, the first event processing request may specify a percentage or specific value of money that should be deposited into each account (e.g., split 50/50 between checking and savings, or the like). In some instances, the second user device 105 may receive the first event processing request through the enterprise application (e.g., mobile banking application).

At step 215, the second user device 105 may send the first event processing request to the enterprise application host platform 102. For example, the second user device 105 may send the first event processing request to the enterprise application host platform 102 while the third connection is established. In some instances, in sending the first event processing request to the enterprise application host platform 102, the second user device 105 may send an endorsed version of the second digital check. For example, the second user device 105 may prompt for an endorsement in the form of a retina scan, a fingerprint, a digital signature, facial authentication, biometric authentication, multi-factor authentication input, and/or otherwise, which may be used to validate the second recipient account as the intended recipient of the second digital check. In some instances, the second user device 105 may compare a value of the second digital check to an endorsement threshold, and may prompt the second recipient for the endorsement based on determining that the value of the second digital check meets or exceeds the endorsement threshold. Otherwise, the second user device 105 might not prompt the second recipient for the endorsement.

At step 216, the enterprise application host platform 102 may receive the first event processing request, sent at step 215. For example, the enterprise application host platform 102 may receive the first event processing request via the communication interface 113 and while the third connection is established.

Figure 2D:
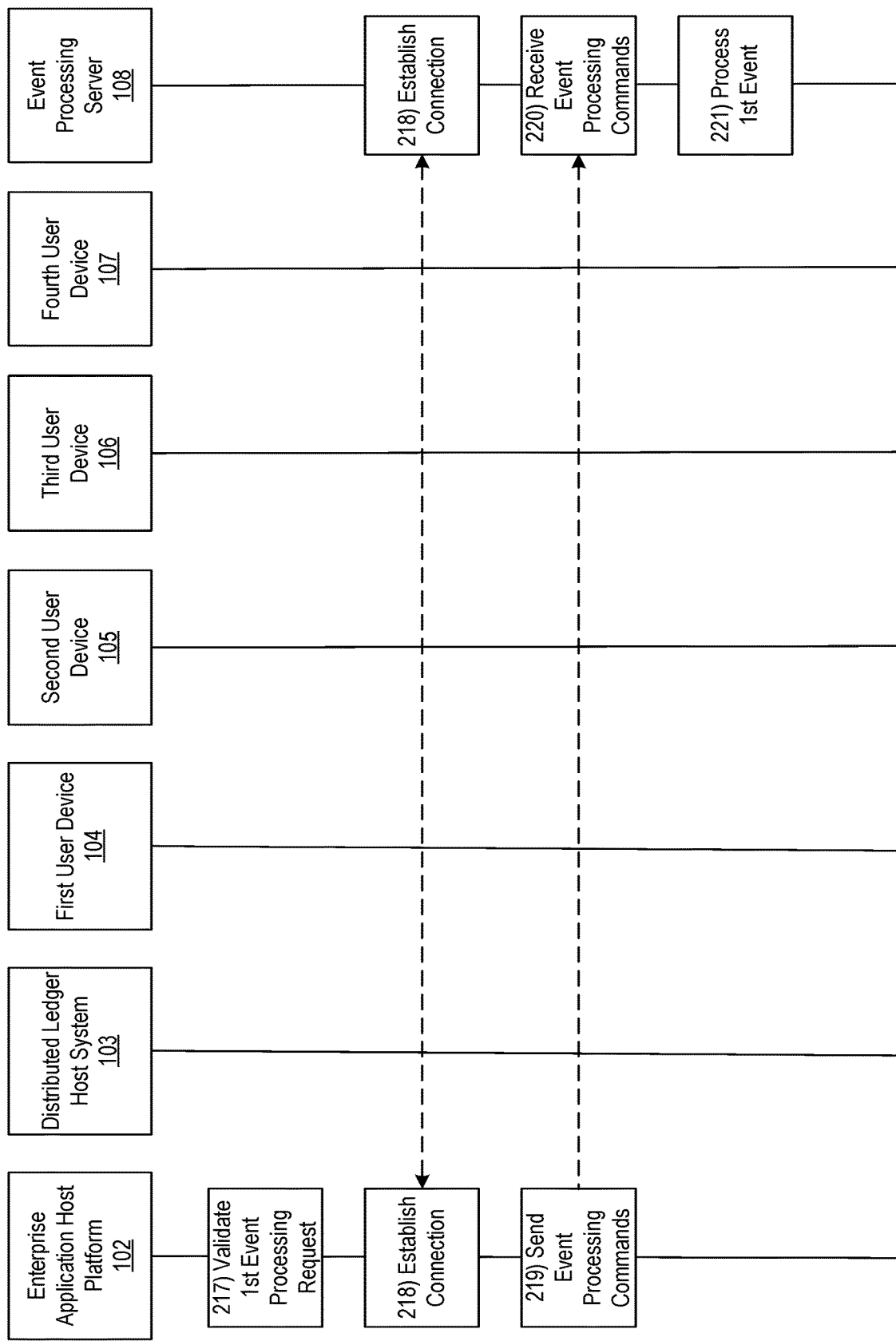

Referring to FIG. 2D, at step 217, the enterprise application host platform 102 may validate the first event processing request. For example, the enterprise application host platform 102 may validate the digital chip and/or watermark in the second digital check, which may indicate that the initial payor (e.g., who issued the initial check which was captured in the first check image at step 201), is in possession of sufficient funds for the second digital check to be executed. For example, funds of the initial payor may be verified (rather than funds of the first recipient) because the first recipient may have routed the first portion of the funds to the second recipient account without depositing them in an account of the first recipient.

Additionally or alternatively, the enterprise application host platform 102 may validate the first event processing request using the distributed ledger. For example, the enterprise application host platform 102 and/or distributed ledger host system 103 may examine the second block of the distributed ledger, which may indicate a value of available funds corresponding to the second digital check, and may identify whether these available funds are sufficient.

Additionally or alternatively, the enterprise application host platform 102 and/or distributed ledger host system 103 may validate the second recipient account (e.g., that the second recipient account is the valid recipient of the second digital check). For example, the enterprise application host platform 102 and/or distributed ledger host system 103 may validate the second recipient account based on the second digital check and/or using the distributed ledger. For example, the enterprise application host platform 102 may verify the retina scan, facial authentication, fingerprint, digital signature, biometric authentication, multi-factor authentication input, and/or other endorsement information received from the second recipient, which may be used to validate the second recipient account as the intended recipient of the second digital check. Additionally or alternatively, the enterprise application host platform 102 may analyze stored data corresponding to the second recipient to verify whether or not the second recipient is authorized to make the deposit. In some instances, the enterprise application host platform 102 may perform such validation based on determining that a value of the second digital check meets or exceeds an endorsement threshold (which may e.g., be the same, or different, than the endorsement threshold described above with regard to step 215). Otherwise, if the enterprise application host platform 102 determines that the value of the second digital check does not meet or exceed the endorsement threshold, it might not perform such validation (or may perform the validation to a lesser degree).

If the enterprise application host platform 102 and/or distributed ledger host system 103 does validate the first event processing request, the enterprise application host platform 102 may proceed to step 218. If the enterprise application host platform 102 and/or distributed ledger host system 103 does not validate the first event processing request, the first event processing request may be denied (e.g., steps 218-222 might not be performed).

At step 218, the enterprise application host platform 102 may establish a connection with the event processing server 108. For example, the enterprise application host platform 102 may establish a fifth connection with the event processing server 108 to link the enterprise application host platform 102 to the event processing server 108 (e.g., in preparation for sending event processing commands). In some instances, the enterprise application host platform 102 may identify whether or not a connection is already established with the event processing server 108. If a connection is already established with the event processing server 108, the enterprise application host platform 102 might not re-establish the connection. If a connection is not yet established with the event processing server 108, the enterprise application host platform 102 may establish the fifth connection as described herein.

At step 219, the enterprise application host platform 102 may send one or more event processing commands directing the event processing server 108 to transfer the first portion of the funds from an account of the initial payor to the one or more accounts of the second recipient. In some instances, the enterprise application host platform 102 may send the one or more event processing commands to the event processing server 108 via the communication interface and while the fifth connection is established. In some instances, the enterprise application host platform 102 may automatically send the one or more event processing commands without receiving an endorsement from the second recipient account (e.g., based on determining that the value of the second digital check does not exceed the endorsement threshold). Additionally or alternatively, in some instances, the enterprise application host platform 102 may automatically send the one or more event processing commands based on the first check transfer request from the first recipient user, which may indicate that the first portion of the funds should be automatically deposited into the second recipient account (and thus an endorsement might not be received from the second recipient account). In some instances, an individual transferring a check may cause automatic deposit into accounts of one or more recipients.

At step 220, the event processing server 108 may receive the event processing commands sent at step 219. For example, the event processing server 108 may receive the event processing commands while the fifth connection is established.

At step 221, based on or in response to the one or more event processing commands received at step 220, the event processing server 108 may process the first event. For example, the event processing server 108 may execute a transfer of funds (e.g., the first portion of the funds) from an account of the initial payor to one or more accounts of the second recipient. For example, if the second digital check had a value of one hundred dollars, the event processing server 108 may cause a transfer of one hundred dollars into one or more accounts of the second recipient. Alternatively, if the first event processing request indicated that the second digital check should only be partially deposited (e.g., only deposit $50 of the $100), the event processing server 108 may cause a transfer of the corresponding amount of funds accordingly.

Figure 2E:
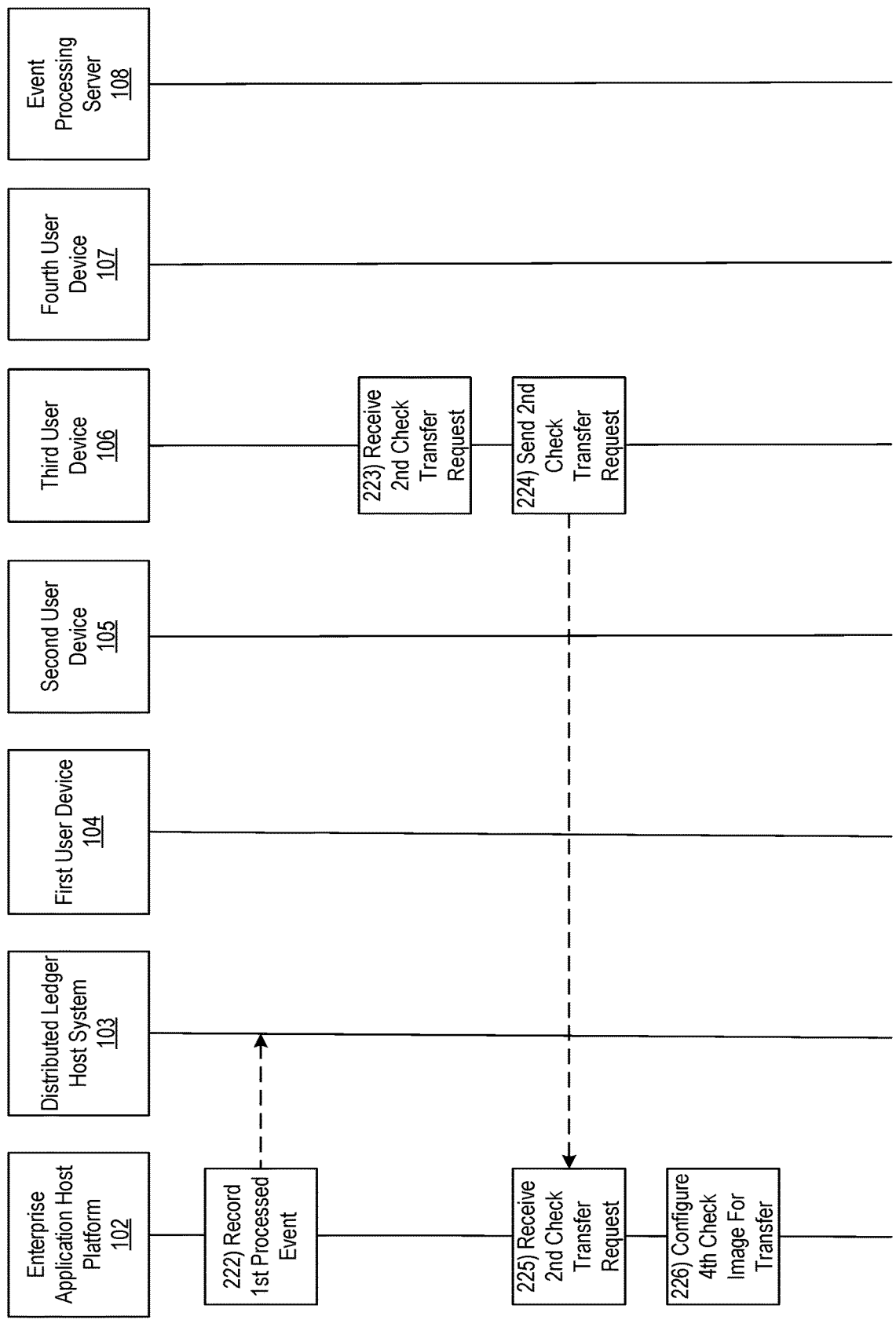

Referring to FIG. 2E, at step 222, the enterprise application host platform 102 may communicate with the distributed ledger host system 103 to record the first processed event. For example, the enterprise application host platform 102 and/or distributed ledger host system 103 may modify the distributed ledger to include a third block that includes a value of each digital check and the corresponding recipient (e.g., $100 deposited in second recipient account, $50—first recipient account; remaining check value: $50, or the like). In these instances, the enterprise application host platform 102 and/or distributed ledger host system 103 may record the first processed event on a single branch of the distributed ledger, representative of both the second and third digital checks. In other instances, the enterprise application host platform 102 and/or distributed ledger host system 103 may record the first event on a branch of the distributed ledger corresponding to the second digital check, different than a branch of the distributed ledger corresponding to the third digital check (e.g., a different branch corresponding to each digital check). In some instances, in modifying the distributed ledger, the enterprise application host platform 102 and/or distributed ledger host system 103 may modify a blockchain, holochain, and/or other distributed ledger.

At step 223, the third user device 106 may receive a second check transfer request. For example, in addition or as an alternative to depositing some or all of the second portion of funds, corresponding to the third digital check, the third recipient may further transfer the third digital check (e.g., similar to the transfer made by the first recipient at step 207). For example, the third user device 106 may receive a request to transfer the third digital check in full or in part.

For example, the third user device 106 may receive user input indicating the second check transfer request through the enterprise application. In these instances, the third user device 104 may receive a request to transfer the third digital check to one or more other recipients (e.g., a fourth recipient), without depositing funds corresponding to the check (either all funds or a portion of the funds) into an account of the third recipient. For example, rather than depositing the second portion of the funds into the third recipient account and generating subsequent checks to transfer the second portion of the funds, the third user device 106 may effectively reassign the value of the third digital check to one or more other recipient accounts. In some instances, the first user device 104 may send a second check transfer request requesting that portions of the funds corresponding to the third digital check be transferred to the fourth recipient.

In some instances, in receiving the second check transfer request, the third user device 106 may receive a selection of the fourth recipient from a friends list (or other list of individuals) within the enterprise application, which may, e.g., avoid the need for the third recipient to know account information for the fourth recipient account.

At step 224, the third user device 106 may send the second check transfer request to the enterprise application host platform 102. For example, the third user device 106 may send the second check transfer request to the enterprise application host platform 102 while the fourth connection is established.

At step 225, the enterprise application host platform 102 may receive the second check transfer request, sent at step 224. For example, the enterprise application host platform 102 may receive the second check transfer request via the communication interface 113 and while the fourth connection is established.

At step 226, the enterprise application host platform 102 may configure a fourth digital check for transfer (e.g., to the fourth recipient account). For example, the enterprise application host platform 102 may generate a new check image indicating a value of the fourth digital check (which in this instance, may be the same as the value of the third digital check or a portion thereof). In these instances, the value, sender, recipient, and/or other information for each check may be included as a watermark on the various digital checks. In some instances, the enterprise application host platform 102 may validate that the sum of the values of the second digital check and the fourth digital check are equivalent to the value of the first digital check. Additionally, the fourth digital check may include updated sender/recipient information (e.g., indicating that the third recipient is transferring the fourth digital check to the fourth recipient). For example, the enterprise application host platform 102 may generate a fourth digital check similar to check image 605, which is shown in FIG. 6, which may indicate (e.g., using a watermark or otherwise) that the value of the fourth digital check is fifty dollars (rather than one hundred and fifty dollars as in the first digital check). In some instances, the enterprise application host platform 102 may also redact any personal identifiable information from the third digital check so as to conceal an initial sender and/or any previous recipients of the third digital check, and may instead display only the current sender/recipient of the fourth digital check. In some instances, the fourth digital check may be a modified version of the first and/or third digital checks. In some instances, the fourth digital check may include the digital chip embedded in the first digital check, indicating that the check is validated (e.g., that the initial payor has sufficient funds to allow processing of the check).

Figure 2F:
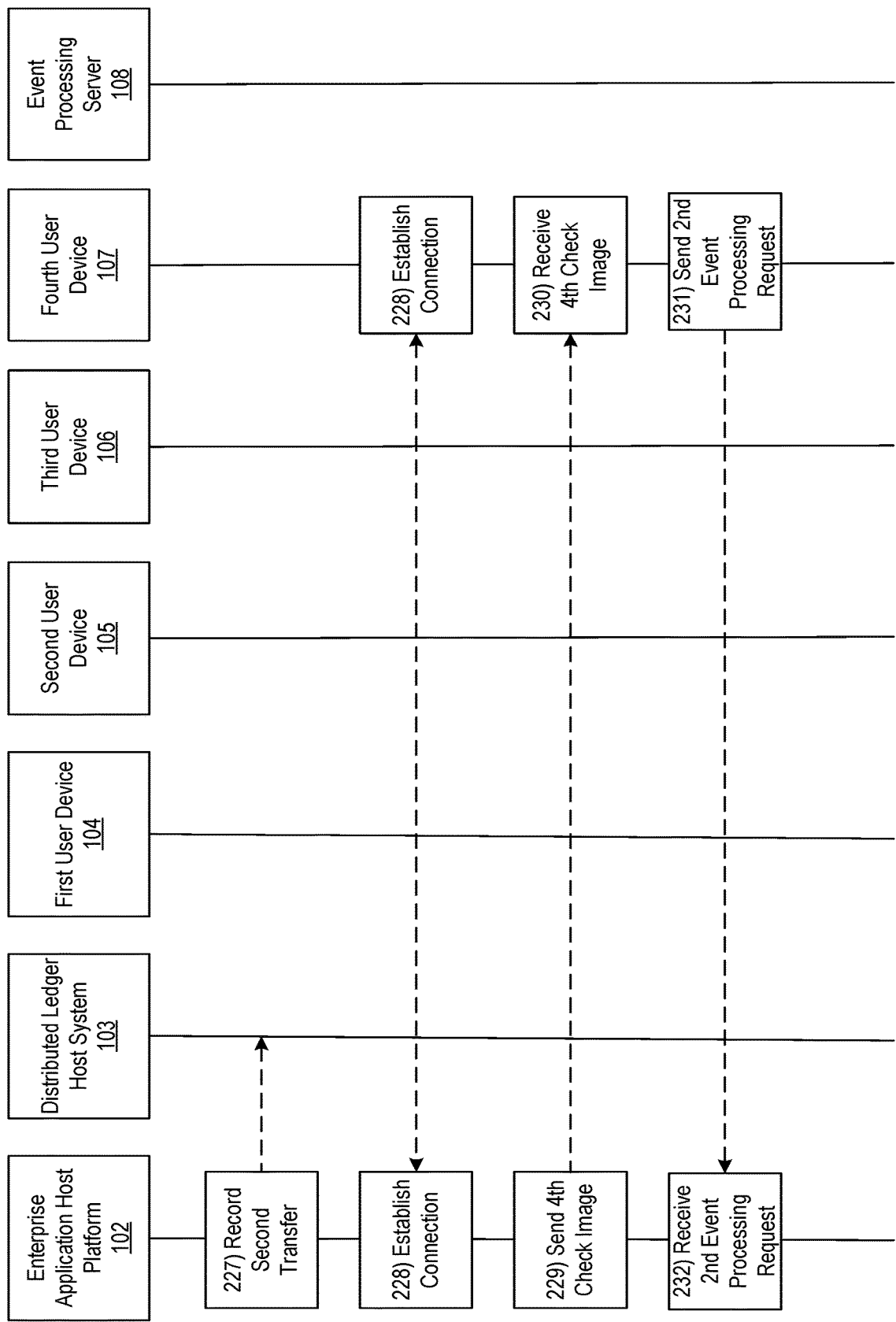

Referring to FIG. 2F, at step 227, in addition or as an alternative to configuring the fourth digital check for transfer (as described above at step 226), the enterprise application host platform 102 may communicate with the distributed ledger host system 103 to record the transfer. For example, the enterprise application host platform 102 and/or distributed ledger host system 103 may modify the distributed ledger to include a third block that includes a value of each digital check and the corresponding recipient (e.g., $100 deposited second recipient account ($0 remain on second digital check); $50, fourth recipient account, or the like). In some instances, the enterprise application host platform 102 and/or distributed ledger host system 103 may record all events/transactions of the initial check (including the split to the second recipient and the third recipient) on a single branch of the distributed ledger. In these instances, the enterprise application host platform 102 and/or distributed ledger host system 103 may record the second transfer to this single branch (e.g., as shown in distributed ledger 805). In other instances, the enterprise application host platform 102 and/or distributed ledger host system 103 may generate separate branches of the distributed ledger, each stemming back to the first block, when a check is split between multiple parties (e.g., a different branch corresponding to each of the second and third digital checks, as shown in distributed ledger 905). In these instances, the enterprise application host platform 102 and/or distributed ledger host system 103 may record the second transfer (e.g., of the fourth digital check) on a branch of the distributed ledger corresponding to the third digital check. In some instances, in the enterprise application host platform 102 and/or distributed ledger host system 103 may convert the fourth digital check to a QR code, and may store the QR code to the distributed ledger. In some instances, in modifying the distributed ledger, the enterprise application host platform 102 and/or distributed ledger host system 103 may modify a blockchain, holochain, and/or other distributed ledger.

At step 228, the enterprise application host platform 102 may establish a connection with the fourth user device 107. For example, the enterprise application host platform 102 may establish a sixth connection with the fourth user device 107 to link the enterprise application host platform 102 to the fourth user device 107 (e.g., in preparation for sending the fourth digital check). In some instances, the enterprise application host platform 102 may identify whether or not a connection is already established with the fourth user device 107. If a connection is already established with the fourth user device 107, the enterprise application host platform 102 might not re-establish the connection. If a connection is not yet established with the fourth user device 107, the enterprise application host platform 102 may establish the sixth connection as described herein.

At step 229, the enterprise application host platform 102 may send the fourth digital check to the fourth user device 107. For example, the enterprise application host platform 102 may send the fourth digital check to the fourth user device 107 via the communication interface 113 and while the sixth connection is established.

In some instances, in addition or as an alternative to sending the fourth digital check, the enterprise application host platform 102 and/or the distributed ledger host system 103 may grant the fourth recipient access to the distributed ledger, so as to access the information of the fourth digital check. In some instances, in granting the access to the distributed ledger, the enterprise application host platform 102 and/or the distributed ledger host system 103 may grant full ledger access to the fourth recipient. In other instances, the enterprise application host platform 102 and/or the distributed ledger host system 103 may grant partial access to the fourth recipient, so as to permit them to view only a portion of the ledger that includes information specific to themselves (e.g., the fourth user might not be able to view the information of the transfer from the initial payor to the first recipient or the information of the transfers from the first recipient to the second and/or third recipients).

At step 230, the fourth user device 107 may receive the fourth digital check. For example, the fourth user device 107 may receive the fourth digital check while the sixth connection is established.

At step 231, the fourth user device 107 may receive a second event processing request and may send the second event processing request to the enterprise application host platform 102. For example, the second user device 105 may receive a request to deposit the second portion of the funds, corresponding to the fourth digital check, into one or more accounts of the fourth recipient (e.g., a savings account, checking account, investment account, and/or other account). For example, the second event processing request may specify a percentage or specific value of money that should be deposited into each account (e.g., split 50/50 between checking and savings, or the like). In some instances, the fourth user device 107 may receive the second event processing request through the enterprise application (e.g., mobile banking application).

After receiving the second event processing request, the fourth user device 107 may send the second event processing request to the enterprise application host platform 102. For example, the fourth user device 107 may send the second event processing request to the enterprise application host platform 102 while the sixth connection is established.

In some instances, in sending the second event processing request to the enterprise application host platform 102, the fourth user device 107 may send an endorsed version of the fourth digital check. For example, the fourth user device 107 may prompt for an endorsement in the form of a retina scan, a fingerprint, a digital signature, facial authentication, biometric authentication, multi-factor authentication input, and/or otherwise, which may be used to validate the fourth recipient account as the intended recipient of the second digital check. In some instances, the fourth user device 107 may compare a value of the fourth digital check to the endorsement threshold, and may prompt the fourth recipient for the endorsement based on determining that the value of the fourth digital check meets or exceeds the endorsement threshold. Otherwise, the fourth user device 107 might not prompt the fourth recipient for the endorsement.

At step 232, the enterprise application host platform 102 may receive the second event processing request, sent at step 215. For example, the enterprise application host platform 102 may receive the second event processing request via the communication interface 113 and while the sixth connection is established.

Figure 2G:
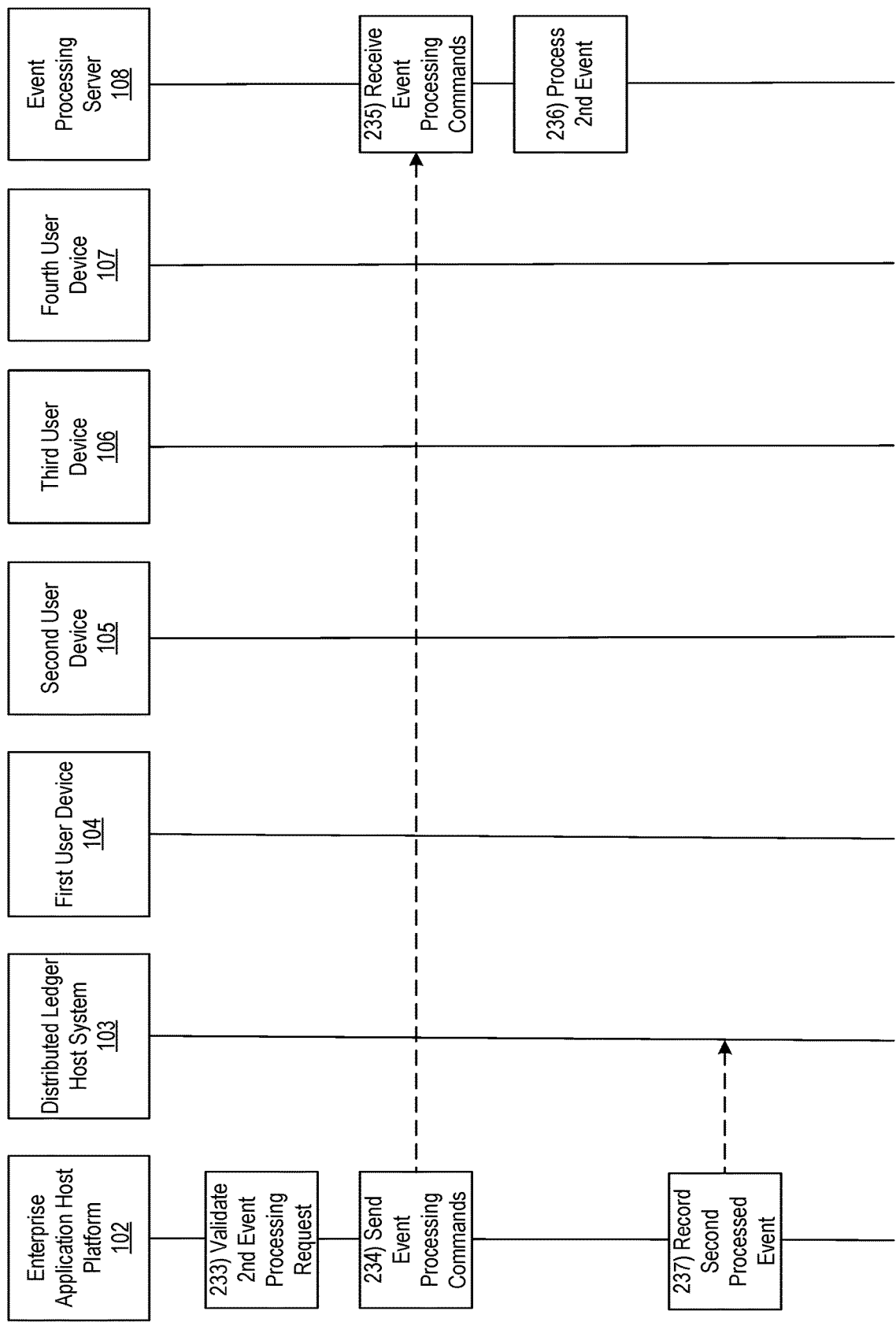

Referring to FIG. 2G, at step 233, the enterprise application host platform 102 may validate the second event processing request. For example, the enterprise application host platform 102 may validate the digital chip and/or watermark in the fourth digital check, which may indicate that the initial payor (e.g., who issued the initial check which was captured in the first check image at step 201), is in possession of sufficient funds for the fourth digital check to be executed. For example, funds of the initial payor may be verified (rather than funds of the third recipient) because the third recipient may have routed the second portion of the funds to the fourth recipient account without depositing them in an account of the third recipient.

Additionally or alternatively, the enterprise application host platform 102 may validate the second event processing request using the distributed ledger. For example, the enterprise application host platform 102 and/or distributed ledger host system 103 may examine the third block of the distributed ledger, which may indicate a value of available funds corresponding to the fourth digital check, and may identify whether these available funds are sufficient.

Additionally or alternatively, the enterprise application host platform 102 and/or distributed ledger host system 103 may validate the fourth recipient account (e.g., that the fourth recipient account is the valid recipient of the fourth digital check). For example, the enterprise application host platform 102 and/or distributed ledger host system 103 may validate the fourth recipient account based on the fourth digital check and/or using the distributed ledger. For example, the enterprise application host platform 102 may verify the retina scan, facial authentication, fingerprint, digital signature, biometric authentication, multi-factor authentication input, and/or other endorsement information received from the fourth recipient, which may be used to validate the fourth recipient account as the intended recipient of the fourth digital check. Additionally or alternatively, the enterprise application host platform 102 may analyze stored data corresponding to the fourth recipient to verify whether or not the fourth recipient is authorized to make the deposit. In some instances, the enterprise application host platform 102 may perform such validation based on determining that a value of the fourth digital check meets or exceeds the endorsement threshold. Otherwise, if the enterprise application host platform 102 determines that the value of the fourth digital check does not meet or exceed the endorsement threshold, it might not perform such validation (or may perform the validation to a lesser degree).

If the enterprise application host platform 102 and/or distributed ledger host system 103 does validate the second event processing request, the enterprise application host platform 102 may proceed to step 234. If the enterprise application host platform 102 and/or distributed ledger host system 103 does not validate the second event processing request, the second event processing request may be denied (e.g., steps 234 to 237 might not be performed).

At step 234, the enterprise application host platform 102 may send one or more event processing commands directing the event processing server 108 to transfer the second portion of the funds from the account of the initial payor to the one or more accounts of the fourth recipient. In some instances, the enterprise application host platform 102 may send the one or more event processing commands to the event processing server 108 via the communication interface 113 and while the fifth connection is established.

In some instances, the enterprise application host platform 102 may automatically send the one or more event processing commands without receiving an endorsement from the fourth recipient account (e.g., based on determining that the value of the fourth digital check does not exceed the endorsement threshold). Additionally or alternatively, in some instances, the enterprise application host platform 102 may automatically send the one or more event processing commands based on the second check transfer request from the third recipient user, which may indicate that the second portion of the funds should be automatically deposited into the fourth recipient account (and thus an endorsement might not be received from the fourth recipient account).

At step 235, the event processing server 108 may receive the event processing commands sent at step 234. For example, the event processing server 108 may receive the event processing commands while the fifth connection is established.

At step 236, based on or in response to the one or more event processing commands received at step 235, the event processing server 108 may process the second event. For example, the event processing server 108 may execute a transfer of funds (e.g., the second portion of the funds) from an account of the initial payor to one or more accounts of the fourth recipient. For example, if the fourth digital check had a value of fifty dollars, the event processing server 108 may cause a transfer of fifty dollars into one or more accounts of the fourth recipient. Alternatively, if the second event processing request indicated that the fourth digital check should only be partially deposited (e.g., only deposit $25 of the $50), the event processing server 108 may cause a transfer of the corresponding amount of funds accordingly.

At step 237, the enterprise application host platform 102 may communicate with the distributed ledger host system 103 to record the second processed event. For example, the enterprise application host platform 102 and/or distributed ledger host system 103 may modify the distributed ledger to include a new block that includes a value of each digital check and the corresponding recipient (e.g., $100 deposited in second recipient account, $50 deposited in fourth recipient account; remaining check value: $0, or the like). In these instances, the enterprise application host platform 102 and/or distributed ledger host system 103 may record the second processed event on a single branch of the distributed ledger (e.g., the same branch as the first processed event). In other instances, the enterprise application host platform 102 and/or distributed ledger host system 103 may record the second event on a branch of the distributed ledger corresponding to the third/fourth digital checks, different than a branch of the distributed ledger corresponding to the second digital check (e.g., a different branch corresponding to each portion of the funds). In some instances, whether a transfer is made from two different parties, from two different branches of the distributed ledger, to a common recipient or entity, the enterprise application host platform 102 and/or distributed ledger host system 103 may merge the branches of the distributed ledger. In some instances, in modifying the distributed ledger, the enterprise application host platform 102 and/or distributed ledger host system 103 may modify a blockchain, holochain, and/or other distributed ledger.

Although the use of watermarks, digital chips, and distributed ledgers are described throughout the illustrative event sequence, these methods may be used independently (where the remaining methods may be optional) or in combination with each other without departing from the scope of the disclosure. Furthermore, although four user devices/recipients are described, this is for illustrative purposes only, and any number of user devices/recipient may be involved in the above described methods without departing from the scope of the disclosure.

By using the methods described above, the convenience of splitting the funds from a check for transfer to multiple parties may be greatly increased. In some instances, this may allow customers to avoid traveling to a physical branch location to execute such transfers. Furthermore, by allowing digital endorsement, multiple parties to checks may provide endorsement regardless of their locations (and even whether or not they are in a common location). Additionally, by allowing transfers in this way, check senders might not need to know account details for a recipient (which may, e.g., be the case if a transfer of funds were otherwise to be performed). Furthermore, by involving the use of distributed ledgers in these methods, the security advantages of an immutable ledger may be achieved in the check transfer process. In addition, in some instances, a transferred check may be recalled or otherwise cancelled (by an individual sending or otherwise transferring the check) prior to being deposited.

Figure 7:
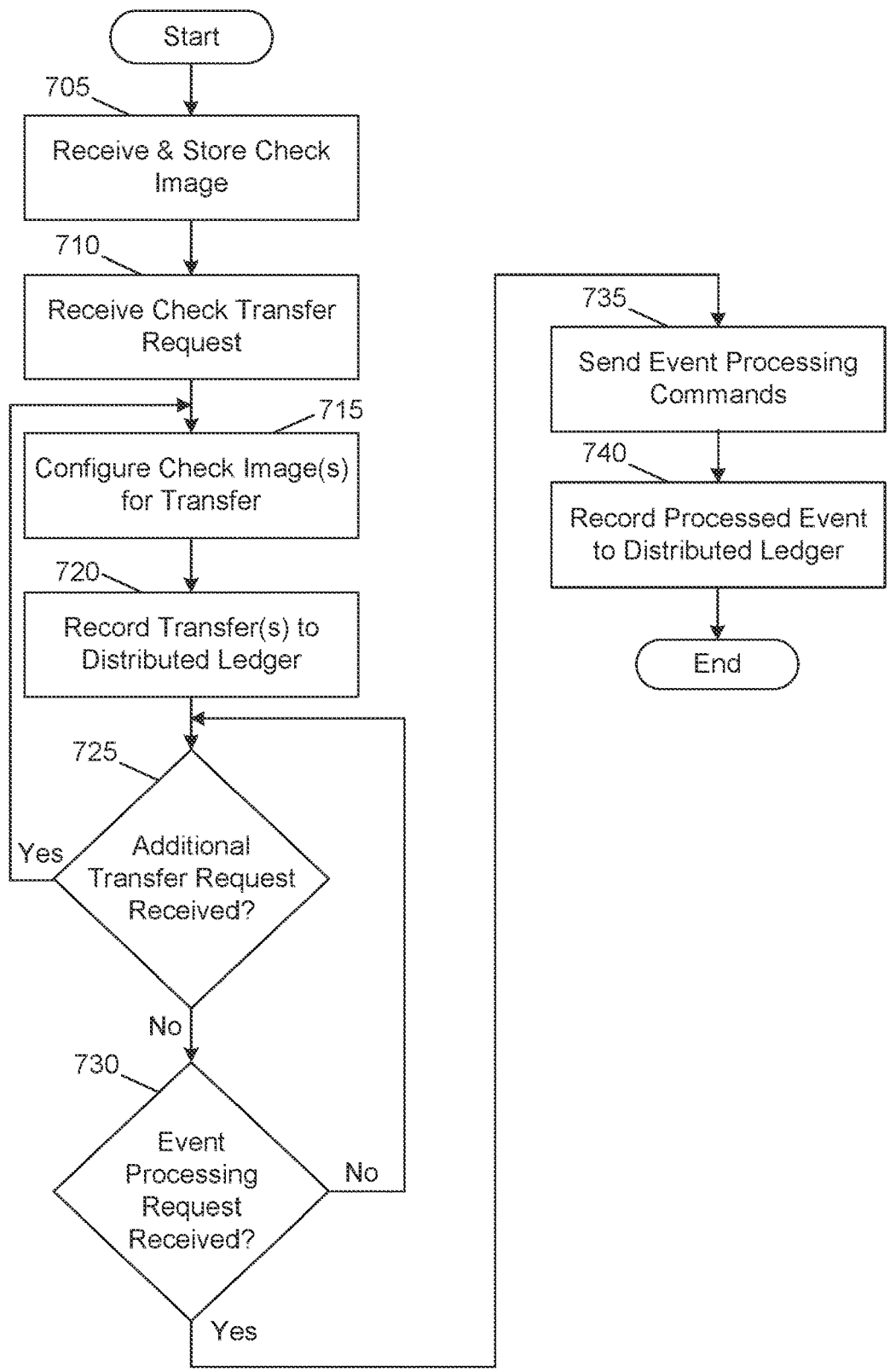
FIG. 7 depicts an illustrative method for performing enhanced digital check transfers in accordance with one or more example embodiments.

FIG. 7 depicts an illustrative method for enhanced digital check transfers in accordance with one or more example embodiments. Referring to FIG. 7, at step 705, a computing platform including one or more processors, memory, and a communication interface may receive and store a check image. At step 710, the computing platform may receive a request to transfer the check to a recipient. At step 715, the computing platform may configure the check image for transfer to the recipient. At step 720, the computing platform may record the transfer to a distributed ledger. At step 725, the computing platform may identify whether a request to transfer the check to another recipient is received. If another transfer request is received, the computing platform may return to step 715. If another transfer request is not received, the computing platform may proceed to step 730.

At step 730, the computing platform may identify whether an event processing request is received. If an event processing request is not received, the computing platform may return to step 725. If an event processing request is received, the computing platform may proceed to step 735. At step 735, the computing platform may send one or more event processing commands directing an event processing server to deposit funds corresponding to the check. At step 740, the computing platform may record the processed event to the distributed ledger.

Figure 10:
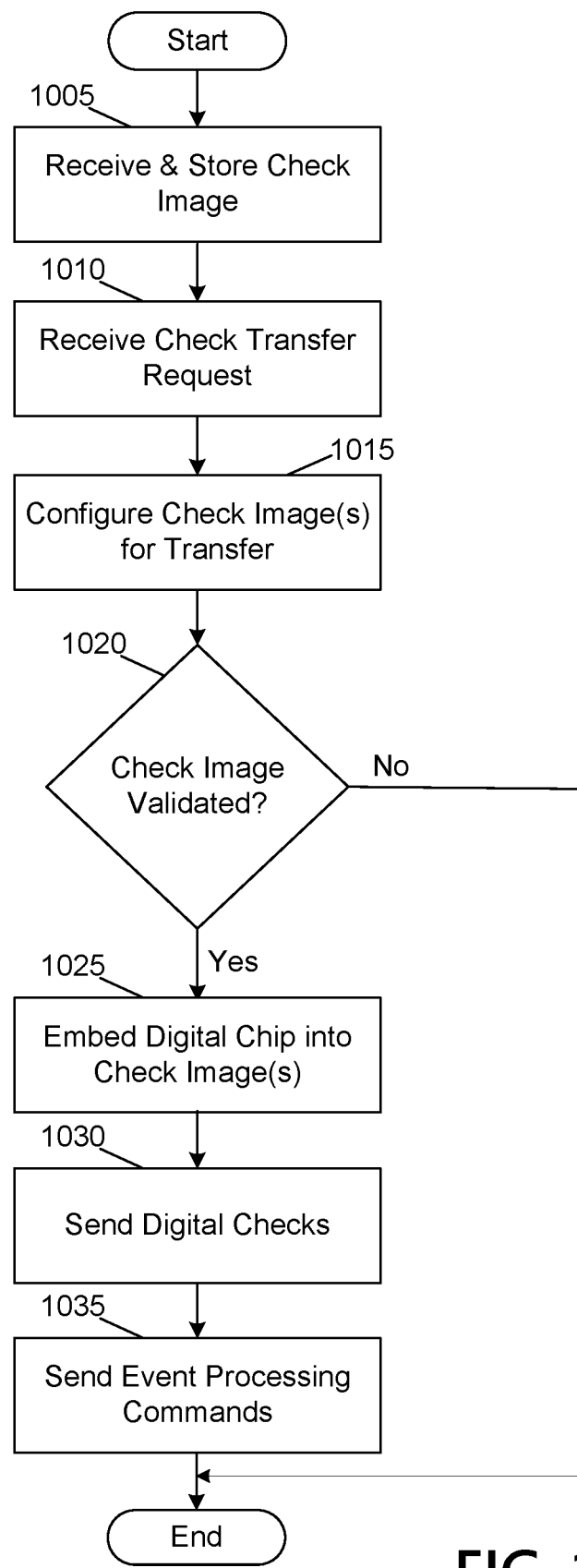
FIGS. 10 and 11 depict illustrative methods for performing enhanced digital check transfers in accordance with one or more example embodiments.

FIG. 10 depicts an illustrative method for enhanced digital check transfers in accordance with one or more example embodiments. Referring to FIG. 10, at step 1005, a computing platform including one or more processors, memory, and a communication interface may receive and store a check image. At step 1010, the computing platform may receive a check transfer request. At step 1015, the computing platform may configure one or more digital checks for transfer. At step 1020, the computing platform may determine whether the check image is validated. If the check image is not validated, the method may end. If the check image is validated, the computing platform may proceed to step 1025. At step 1025, the computing platform may embed a digital chip into the one or more digital checks. At step 1030, the computing platform may send the one or more digital checks to their recipients. At step 1035, the computing platform may send one or more event processing commands directing an event processing system to process the one or more digital checks.

Figure 11:
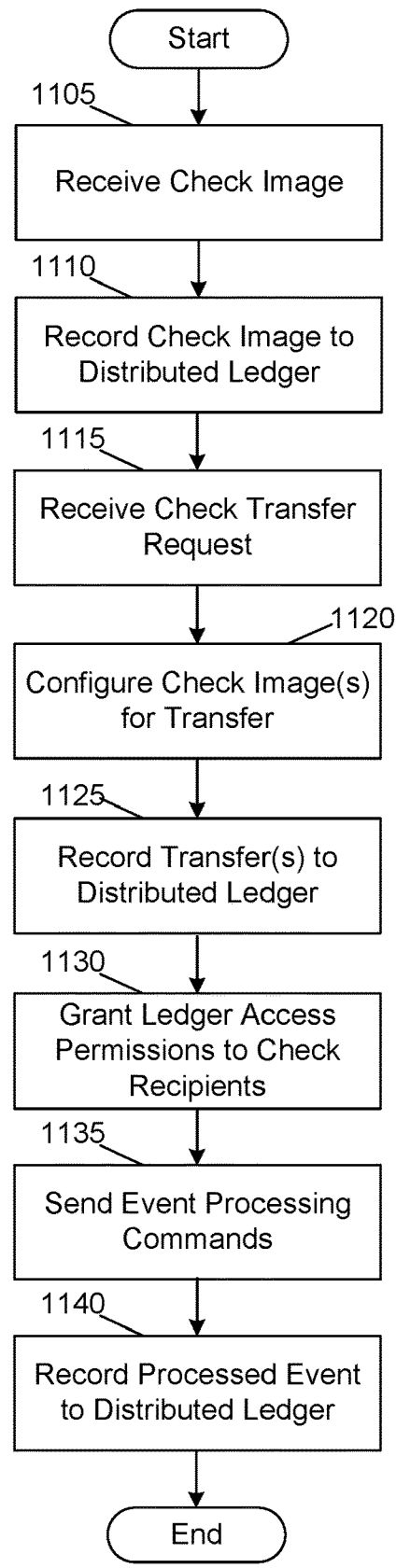

FIG. 11 depicts an illustrative method for enhanced digital check transfers in accordance with one or more example embodiments. Referring to FIG. 11, at step 1105, a computing platform including one or more processors, memory, and a communication interface may receive a check image. At step 1110, the computing platform may record the check image to a distributed ledger. At step 1115, the computing platform may receive a check transfer request. At step 1120, the computing platform may configure the check image for transfer. At step 1125, the computing platform may record the transfer to the distributed ledger. At step 1130, the computing platform may grant ledger access permissions to recipients of the check image. At step 1135, the computing platform may send one or more event processing commands directing an event processing system to process the check image. At step 1140, the computing platform may record the processed event to the distributed ledger.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for performing a blockchain, biometric, and digital chip based method for uploading a digital image of a check and securely disbursing portions of the check to multiple parties, the computing platform comprising:
   at least one processor;
   a communication interface communicatively coupled to the at least one processor;
   a biometric retina scanner; and
   memory storing computer-readable instructions that, when executed by the at least one processor, cause the computing platform to:
      receive a first digital check image, the first digital check image including an initial payor, a first recipient, and an amount of funds;
      store, in a distributed ledger, the initial payor, the first recipient, and the amount of funds, wherein storing the initial payor, the first recipient, and the amount of funds in the distributed ledger comprises:
         communicating with a distributed ledger host platform to validate the first digital check image, and based on validating the first digital check image, creating an initial block in a new chain of the distributed ledger, wherein the initial payor, the first recipient, and the amount of funds are stored within a quick response (QR) code within the distributed ledger;
      receive, from a first user device associated with the first recipient, a request to transfer a first portion of the funds, the first portion of the funds being a portion of the amount of the funds of the first digital check image, to an account of a second recipient and a second portion of the funds, the second portion of the funds being a portion of the amount of funds of the first digital check image, to an account of a third recipient, wherein the first recipient, the second recipient, and the third recipient are unique individuals;

generate a second digital check image representative of the first portion of the funds, wherein the second digital check image includes a watermark indicating a value of the first portion of the funds, wherein generating the second digital check image includes redacting personal identifiable information (PII) from the first digital check image;

generate a third digital check image representative of the second portion of the funds, wherein the third digital check image includes a watermark indicating a value of the second portion of the funds, wherein generating the third digital check image includes redacting PII from the second digital check image;

validate the second digital check image and the third digital check image;

based on successful validation of the second digital check image and the third digital check image, embed, into the second digital check image and the third digital check image, a digital chip that indicates the successful validation and store information of the second digital check image and the third digital check image to the distributed ledger;

send, to the account of the second recipient and the account of the third recipient, the second digital check image and the third digital check image respectively, wherein sending the second digital check image and the third digital check image comprises:
  granting partial distributed ledger access to each of the second recipient and the third recipient, wherein the partial distributed ledger access enables the second recipient and the third recipient to access only information corresponding to their respective digital checks;

receive a request to deposit the second digital check image, wherein receiving the request to deposit the second digital check image includes receiving an endorsement of the second digital check image by the second recipient, and wherein the endorsement comprises results of a retina scan by the biometric retina scanner;

in response to receiving the request to deposit the second digital check image, send one or more commands to an event processing server directing the event processing server to execute a transfer of the first portion of the funds from an account of the initial payor of the first digital check image to the account of the second recipient, wherein sending the one or more commands to the event processing server directing the event processing server to execute the transfer of the first portion of the funds from the account of the initial payor of the first digital check image to the account of the second recipient causes the event processing server to execute the transfer of the first portion of the funds from the account of the initial payor of the first digital check image to the account of the second recipient; and record, in the distributed ledger, the transfer of the first portion of the funds from the account of the initial payor of the first digital check image to the account of the second recipient.

2. The computing platform of claim 1, wherein the memory stores additional computer-readable instructions that, when executed by the at least one processor, cause the computing platform to:
  receive a request to deposit the second digital check image, wherein sending the one or more commands to the event processing server directing the event processing server to execute the transfer of the first portion of the funds from the account of the initial payor of the first digital check image to the account of the second recipient is in response to receiving the request to deposit the second digital check image.

3. The computing platform of claim 2, wherein receiving the request to deposit the second digital check image includes receiving an endorsement of the second digital check image by the second recipient.

4. The computing platform of claim 3, wherein receiving the endorsement further comprises receiving one or more of: a fingerprint, a faceprint, a digital signature, or a multi-factor authentication input.

5. The computing platform of claim 3, wherein the memory stores additional computer-readable instructions that, when executed by the at least one processor, cause the computing platform to:
  compare a value of the first portion of the funds to an endorsement threshold; and
  based on identifying that the first portion of the funds exceeds the endorsement threshold, prompt the second recipient for the endorsement.

6. The computing platform of claim 1, wherein the computing platform automatically sends the one or more commands to the event processing server directing the event processing server to execute the transfer of the first portion of the funds from the account of the initial payor of the first digital check image to the account of the second recipient.

7. The computing platform of claim 6, wherein automatically sending the one or more commands to the event processing server directing the event processing server to execute the transfer of the first portion of the funds from the account of the initial payor of the first digital check image to the account of the second recipient comprises automatically causing a deposit of the first portion of the funds from the account of the initial payor of the first digital check image to the account of the second recipient without receiving an endorsement from the second recipient.

8. The computing platform of claim 1, wherein sending the one or more commands to the event processing server directing the event processing server to execute the transfer of the first portion of the funds from the account of the initial payor of the first digital check image to the account of the second recipient is based on verification of the embedded digital chip.

9. The computing platform of claim 1, wherein receiving the request to transfer the first portion of the funds to the account of the second recipient comprises receiving a user input, within the account of the first recipient, selecting the second recipient, wherein the second recipient is selected from a friends list within a mobile banking application.

10. The computing platform of claim 1, wherein the funds are not distributed to an account of the first recipient.

11. The computing platform of claim 1, wherein the memory stores additional computer-readable instructions that, when executed by the at least one processor, cause the computing platform to:
  receive, from the account of the third recipient, a request to transfer the second portion of the funds to an account of a fourth recipient;
  generate a fourth digital check image representative of the second portion of the funds; and send, to the account of the fourth recipient and without disbursing the second portion of the funds to the account of the third recipient, the fourth digital check image.

12. The computing platform of claim 11, wherein the fourth digital check image does not include the PII of the initial payor of the first digital check image.

13. The computing platform of claim 11, wherein the memory stores additional computer-readable instructions that, when executed by the at least one processor, cause the computing platform to:
receive user input from the fourth recipient indicating that the second portion of the funds should be split between multiple accounts corresponding to the fourth recipient; and
send one or more commands to the event processing server directing the event processing server to execute a transfer of the second portion of the funds from the account of the initial payor of the first digital check image to the multiple accounts of the fourth recipient, wherein the multiple accounts include a checking account and a savings account.

14. The computing platform of claim 1, wherein validating the second digital check image and the third digital check image comprises validating, using the distributed ledger, the second digital check image and the third digital check image.

15. The computing platform of claim 1, wherein the first digital check image and the second digital check image do not indicate an initial value of the first digital check image.

16. A blockchain, biometric, and digital chip based method for uploading a digital image of a check and securely disbursing portions of the check to multiple parties, the method comprising:
at a computing platform comprising a biometric retina scanner, at least one processor, a communication interface, and memory:
receiving a first digital check image, the first digital check image including an initial payor, a first recipient, and an amount of funds;
storing, in a distributed ledger, the initial payor, the first recipient, and the amount of funds, wherein storing the initial payor, the first recipient, and the amount of funds in the distributed ledger comprises:
communicating with a distributed ledger host platform to validate the first digital check image, and based on validating the first digital check image, creating an initial block in a new chain of the distributed ledger, wherein the initial payor, the first recipient, and the amount of funds are stored within a quick response (QR) code within the distributed ledger;
receiving, from a first user device associated with the first recipient, a request to transfer a first portion of the funds, the first portion of the funds being a portion of the amount of the funds of the first digital check image, to an account of a second recipient and a second portion of the funds, the second portion of the funds being a portion of the amount of funds of the first digital check image, to an account of a third recipient, wherein the first recipient, the second recipient, and the third recipient each correspond to unique individuals;
generating a second digital check image representative of the first portion of the funds, wherein the second digital check image includes a watermark indicating a value of the first portion of the funds, wherein generating the second digital check image includes redacting personal identifiable information (PII) from the first digital check image;
generating a third digital check image representative of the second portion of the funds, wherein the third digital check image includes a watermark indicating a value of the second portion of the funds, wherein generating the third digital check image includes redacting PII from the second digital check image;
validating the second digital check image and the third digital check image;
based on successful validation of the second digital check image and the third digital check image, embedding, into the second digital check image and the third digital check image, a digital chip that indicates the successful validation and storing information of the second digital check image and the third digital check image to the distributed ledger;
sending, to the account of the second recipient and the account of the third recipient, the second digital check image and the third digital check image respectively, wherein sending the second digital check image and the third digital check image comprises:
granting partial distributed ledger access to each of the second recipient and the third recipient, wherein the partial distributed ledger access enables the second recipient and the third recipient to access only information corresponding to their respective digital checks;
receiving a request to deposit the second digital check image, wherein receiving the request to deposit the second digital check image includes receiving an endorsement of the second digital check image by the second recipient, and wherein the endorsement comprises results of a retina scan by the biometric retina scanner;
in response to receiving the request to deposit the second digital check image, sending one or more commands to an event processing server directing the event processing server to execute a transfer of the first portion of the funds from an account of the initial payor of the first digital check image to the account of the second recipient, wherein sending the one or more commands to the event processing server directing the event processing server to execute the transfer of the first portion of the funds from the account of the initial payor of the first digital check image to the account of the second recipient causes the event processing server to execute the transfer of the first portion of the funds from the account of the initial payor of the first digital check image to the account of the second recipient; and
recording, in the distributed ledger, the transfer of the first portion of the funds from the account of the initial payor of the first digital check image to the account of the second recipient.

17. The method of claim 16, further comprising:
receiving a request to deposit the second digital check image, wherein sending the one or more commands to the event processing server directing the event processing server to execute the transfer of the first portion of the funds from the account of the initial payor of the first digital check image to the account of the second recipient is in response to receiving the request to deposit the second digital check image.

18. The method of claim 17, wherein receiving the request to deposit the second digital check image includes receiving an endorsement of the second digital check image by the second recipient.

19. The method of claim 18, wherein receiving the endorsement further comprises receiving one or more of: a fingerprint, a faceprint, a digital signature, or a multi-factor authentication input.

20. One or more non-transitory computer-readable media storing instructions that, when executed by a computing platform for performing a blockchain, biometric, and digital chip based method for uploading a digital image of a check and securely disbursing portions of the check to multiple parties, the computing platform comprising a biometric retina scanner, at least one processor, a communication interface, and memory, cause the computing platform to:
  receive a first digital check image, the first digital check image including an initial payor, a first recipient, and an amount of funds;
  store, in a distributed ledger, the initial payor, the first recipient, and the amount of funds, wherein storing the initial payor, the first recipient, and the amount of funds in the distributed ledger comprises:
    communicating with a distributed ledger host platform to validate the first digital check image, and
    based on validating the first digital check image, creating an initial block in a new chain of the distributed ledger, wherein the initial payor, the first recipient, and the amount of funds are stored within a quick response (QR) code within the distributed ledger;
  receive, from a first user device associated with the first recipient, a request to transfer a first portion of the funds, the first portion of the funds being a portion of the amount of the funds of the first digital check image, to an account of a second recipient and a second portion of the funds, the second portion of the funds being a portion of the amount of funds of the first digital check image, to an account of a third recipient, wherein the first recipient, the second recipient, and the third recipient are unique individuals;
  generate a second digital check image representative of the first portion of the funds, wherein the second digital check image includes a watermark indicating a value of the first portion of the funds, wherein generating the second digital check image includes redacting personal identifiable information (PII) from the first digital check image;
  generate a third digital check image representative of the second portion of the funds, wherein the third digital check image includes a watermark indicating a value of the second portion of the funds, wherein generating the third digital check image includes redacting PII from the second digital check image;
  validate the second digital check image and the third digital check image;
  based on successful validation of the second digital check image and the third digital check image, embed, into the second digital check image and the third digital check image, a digital chip that indicates the successful validation and store information of the second digital check image and the third digital check image to the distributed ledger;
  send, to the account of the second recipient and the account of the third recipient, the second digital check image and the third digital check image respectively, wherein sending the second digital check image and the third digital check image comprises:
    granting partial distributed ledger access to each of the second recipient and the third recipient, wherein the partial distributed ledger access enables the second recipient and the third recipient to access only information corresponding to their respective digital checks;
  receive a request to deposit the second digital check image, wherein receiving the request to deposit the second digital check image includes receiving an endorsement of the second digital check image by the second recipient, and wherein the endorsement comprises results of a retina scan from the biometric retina scanner;
  in response to receiving the request to deposit the second digital check image, send one or more commands to an event processing server directing the event processing server to execute a transfer of the first portion of the funds from an account of the initial payor of the first digital check image to the account of the second recipient, wherein sending the one or more commands to the event processing server directing the event processing server to execute the transfer of the first portion of the funds from the account of the initial payor of the first digital check image to the account of the second recipient causes the event processing server to execute the transfer of the first portion of the funds from the account of the initial payor of the first digital check image to the account of the second recipient; and
  recording, in the distributed ledger, the transfer of the first portion of the funds from the account of the initial payor of the first digital check image to the account of the second recipient.

* * * * *